March 8, 1966
A. L. COULTER
3,238,821
AUTOMATIC FEED DEVICE
Filed Feb. 28, 1963
11 Sheets-Sheet 1
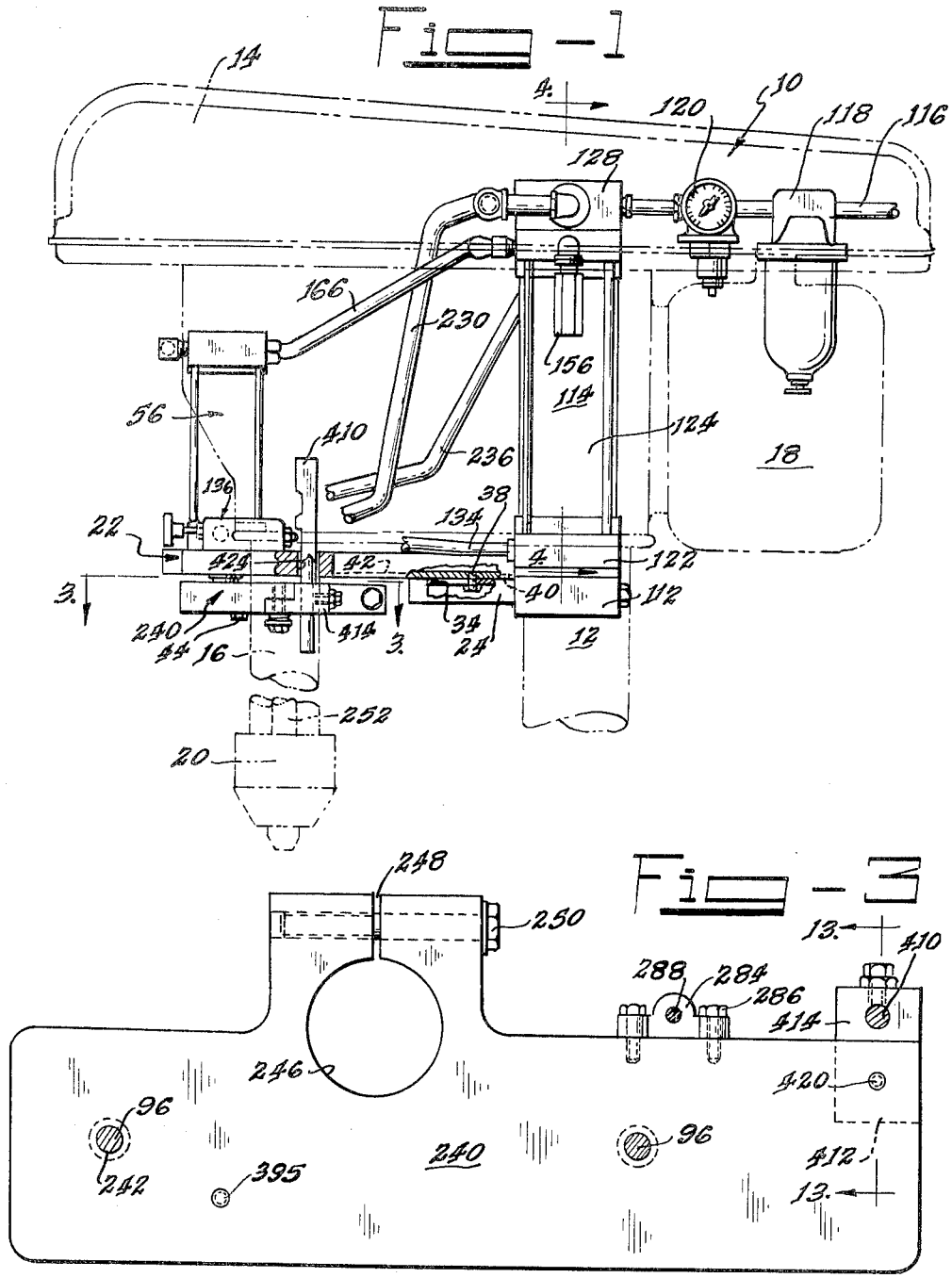
Inventor
By: Albert L. Coulter
Stone, Nierman,
Burmeister & Zummer
Attorneys

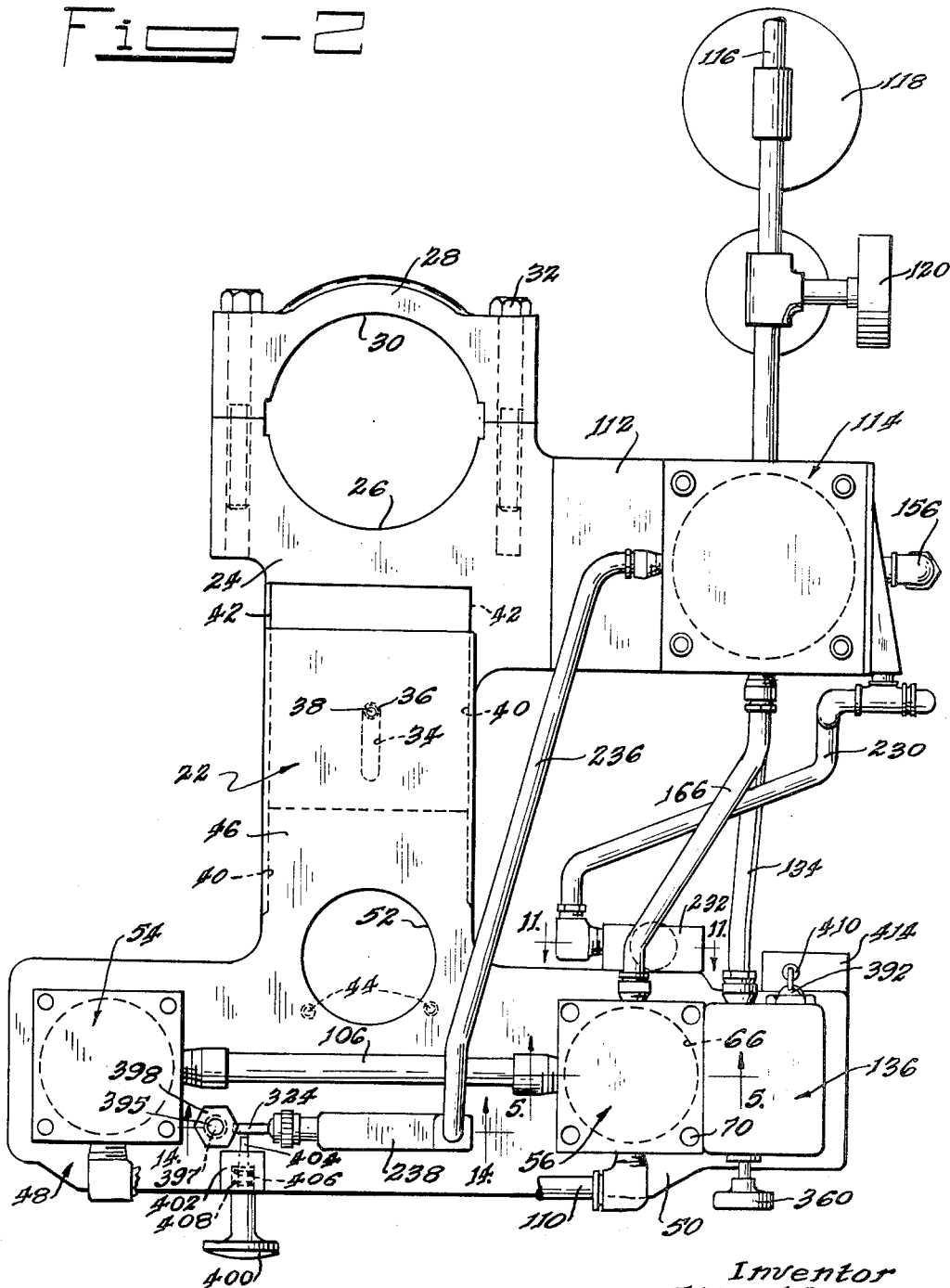

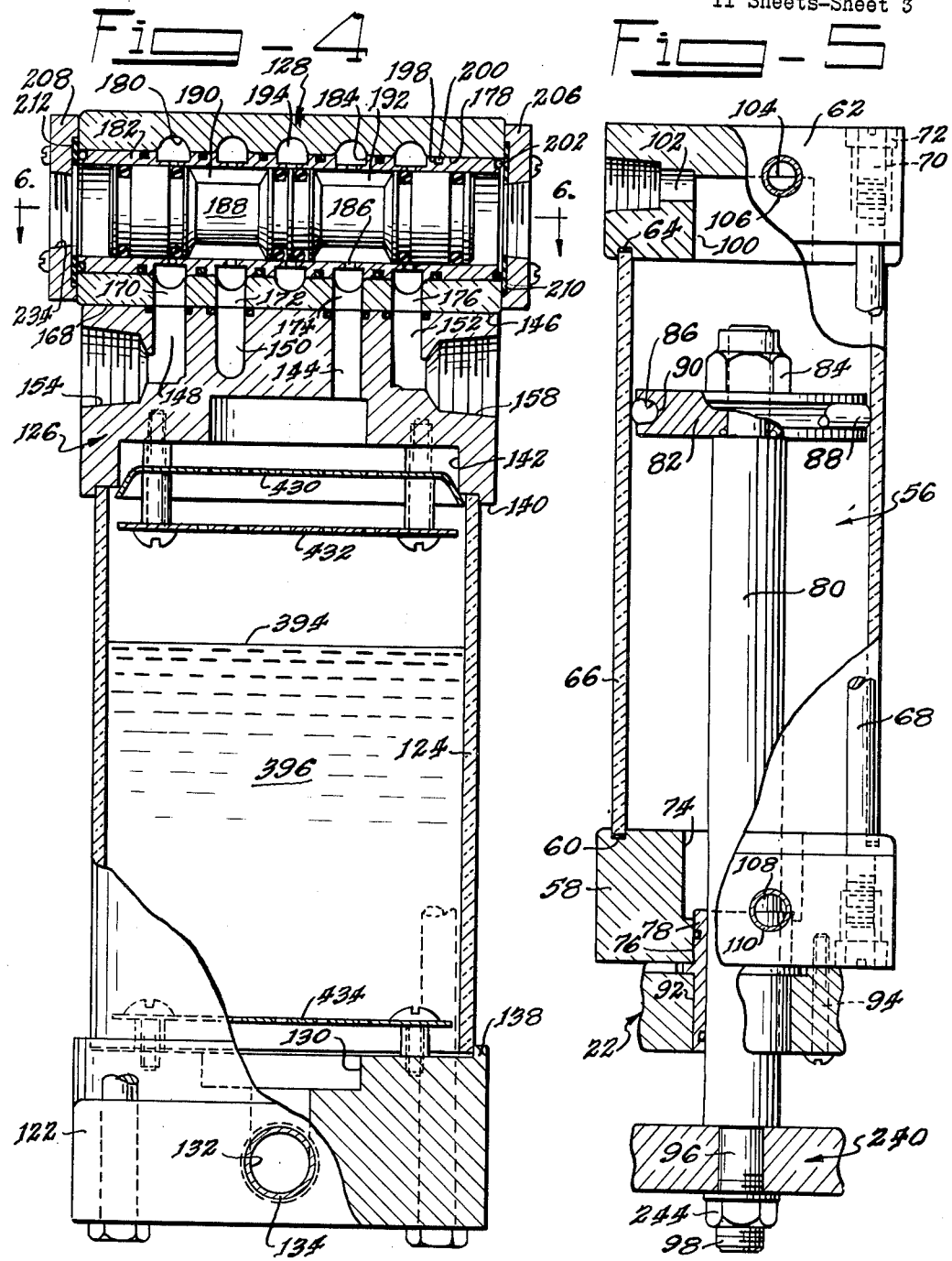

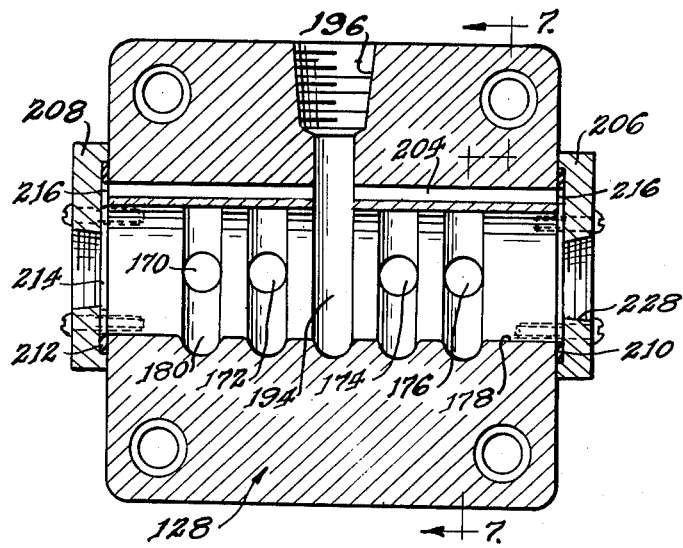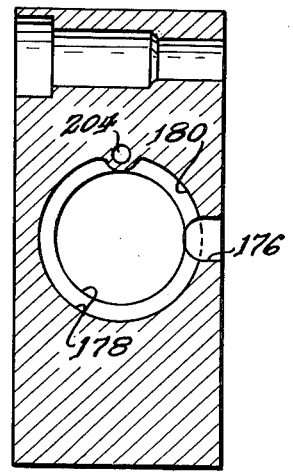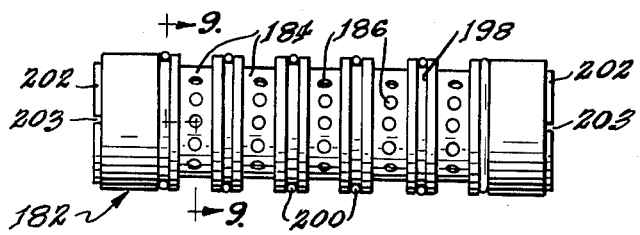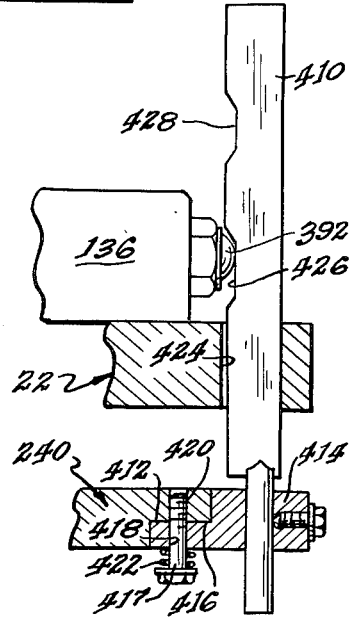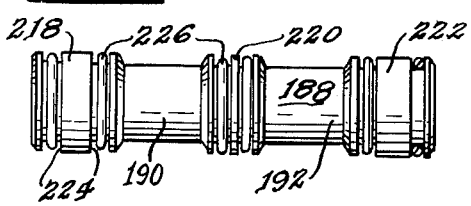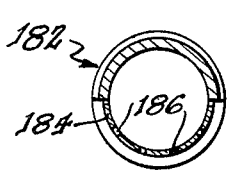

March 8, 1966  A. L. COULTER  3,238,821
AUTOMATIC FEED DEVICE
Filed Feb. 28, 1963  11 Sheets-Sheet 5
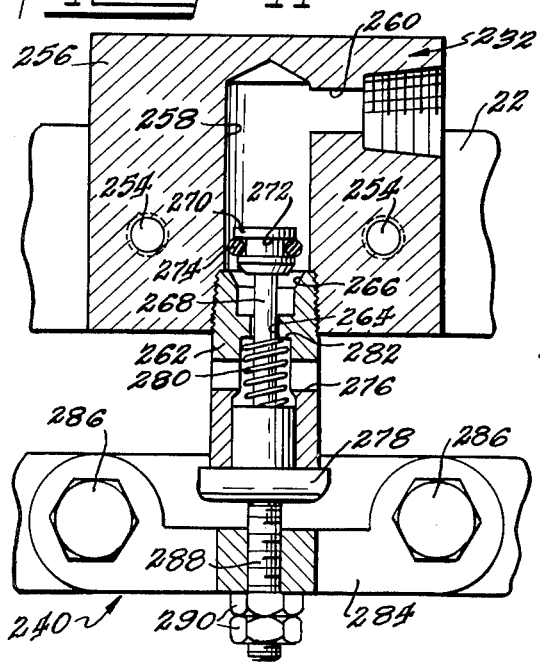
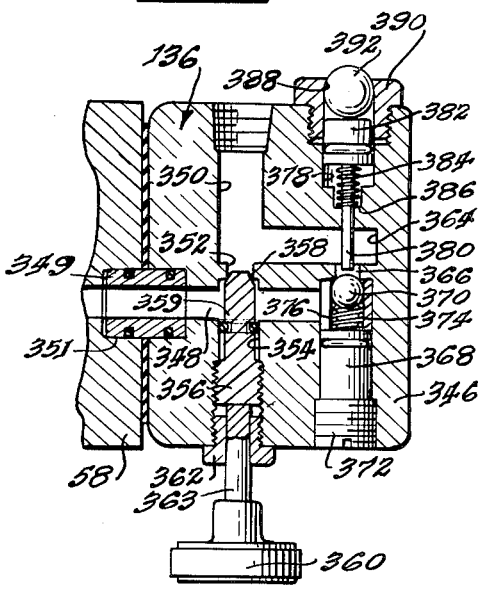
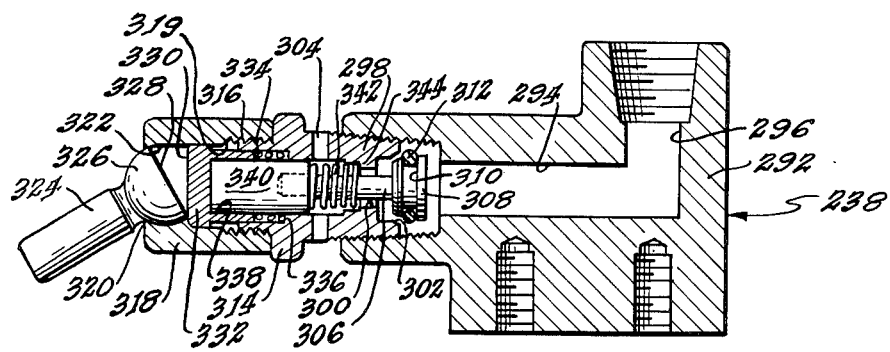
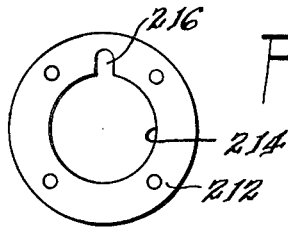
Inventor
Albert L. Coulter
By: Stone, Nierman,
Burmeister & Zummer
Attorney

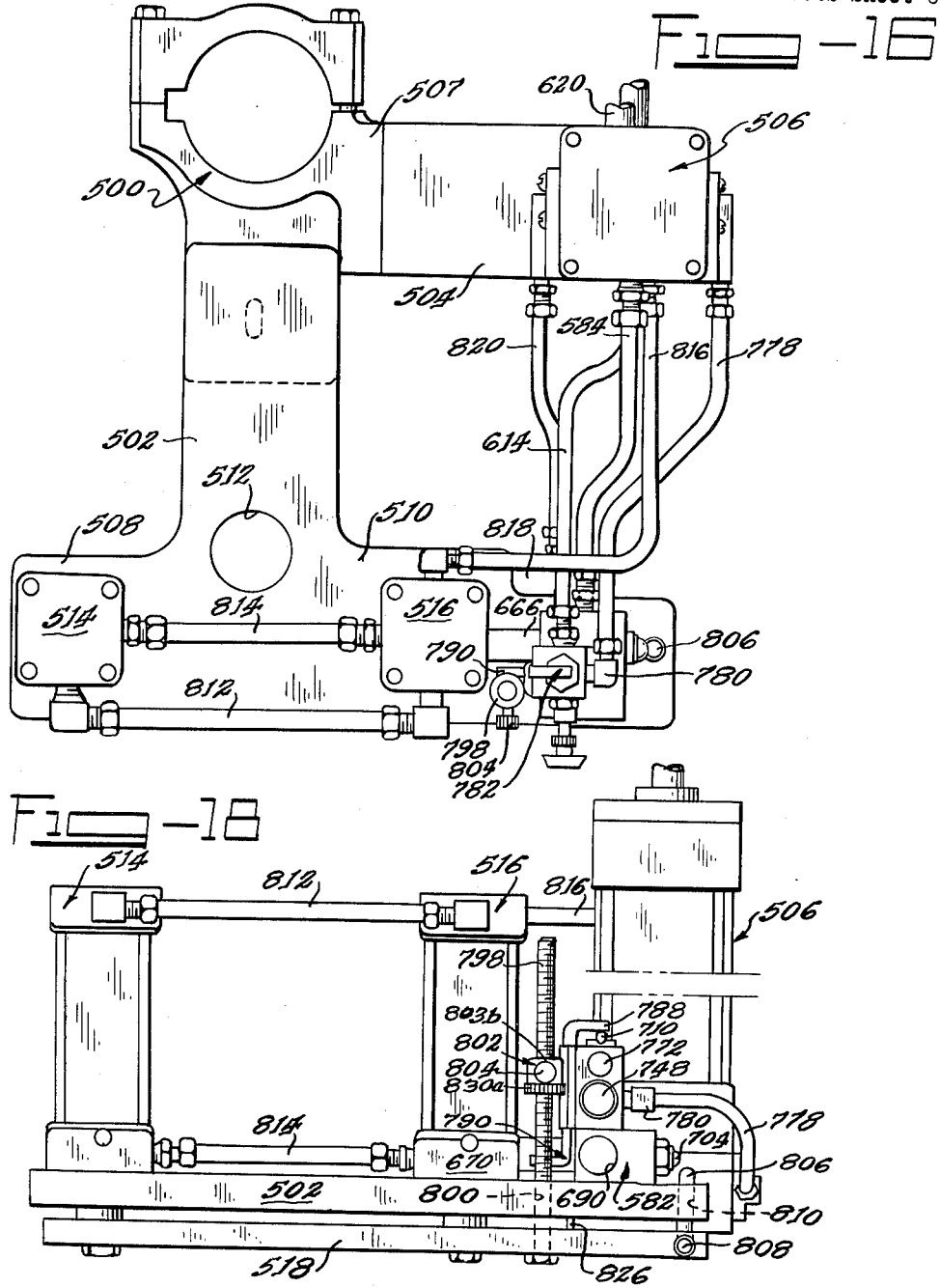

March 8, 1966 A. L. COULTER 3,238,821
AUTOMATIC FEED DEVICE
Filed Feb. 28, 1963 11 Sheets-Sheet 7

INVENTOR.
Albert L. Coulter
BY
Stone, Nierman,
Burmeister & Jummer
Attorneys

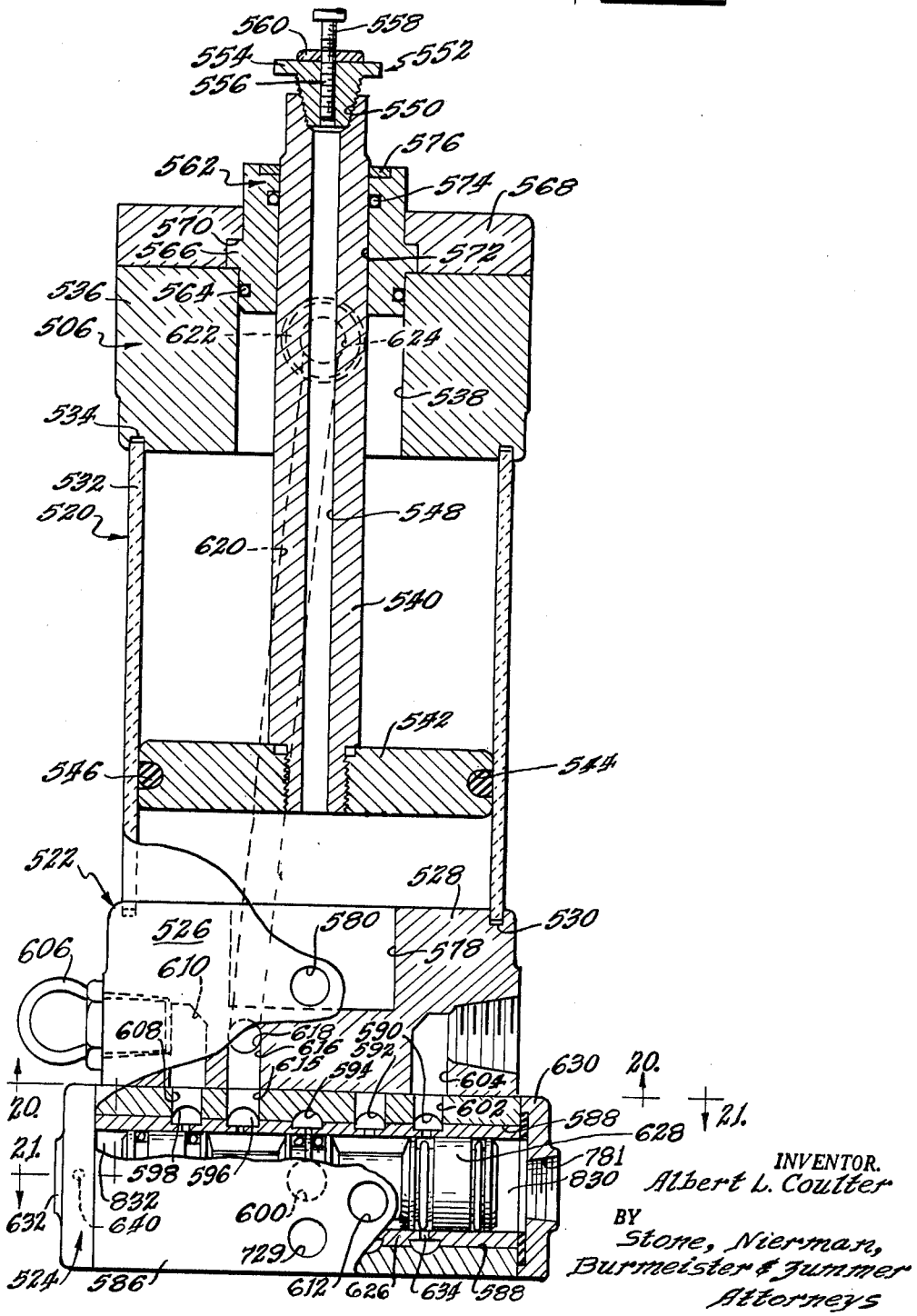

March 8, 1966  A. L. COULTER  3,238,821
AUTOMATIC FEED DEVICE
Filed Feb. 28, 1963  11 Sheets-Sheet 9

INVENTOR.
Albert L. Coulter
BY
Stone, Nierman,
Burmeister & Jummer
Attorneys

March 8, 1966  A. L. COULTER  3,238,821
AUTOMATIC FEED DEVICE
Filed Feb. 28, 1963
11 Sheets-Sheet 10

INVENTOR.
Albert L. Coulter
BY Stone, Nierman,
Burmeister & Zummer
Attorneys

March 8, 1966
A. L. COULTER
3,238,821
AUTOMATIC FEED DEVICE
Filed Feb. 28, 1963
11 Sheets-Sheet 11
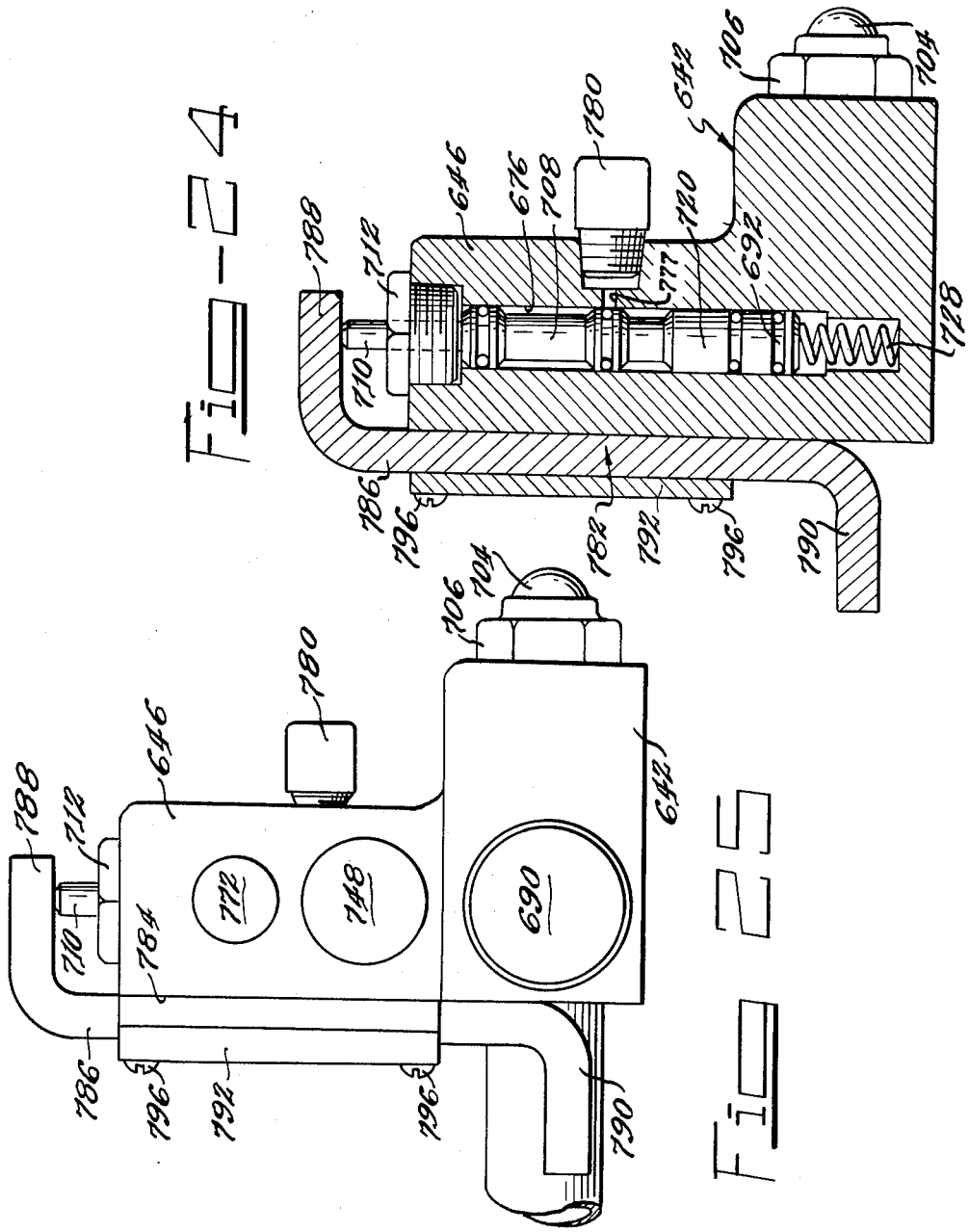
INVENTOR.
Albert L. Coulter
BY
Stone, Nierman,
Burmeister & Zummer
Attorneys

United States Patent Office 3,238,821
Patented Mar. 8, 1966

3,238,821
AUTOMATIC FEED DEVICE
Albert L. Coulter, P.O. Box 131, 612 Eastway Drive,
Island Lake, Ill.
Filed Feb. 28, 1963, Ser. No. 261,727
21 Claims. (Cl. 77—32.1)

The present invention relates generally to devices for automatically feeding a tool against a work piece, and particularly to a device for automatically feeding and cycling a drill press.

While the present invention may be utilized with most types of machine tools, it is perhaps most readily illustrated applied to a drill press. Most drill press operations require a drill, which is rotatably mounted on a translatable quill, to be translated into contact with a work piece to perform a single operation. Thereafter, the operator either replaces the work piece with a new work piece or positions the work piece for a new operation. The drill is then once again translated into abutment with the work piece, and this cycle is repeated until the run of operations terminates.

In accordance with the present invention, a feed mechanism is associated with the machine tool, in the illustrated embodiment a drill press, to cause the tool or drill thereof to be translated toward the work piece on command, perform the desired operation on the work piece, withdraw from the work piece, and periodically repeat the cycle automatically until manually stopped. The feed mechanism of this invention may also be manually actuated for each cycle if desired.

It is an object of the present invention to provide a novel reversible feed mechanism for a machine tool, such as a drill press, in which a cylinder is used to drive the tool and the piston within the cylinder is subjected on one side to compressed air and on the other side to a liquid. Also, it is an object of the present invention to provide such a feed mechanism in which the rate of flow of the liquid is controlled by a metering valve to control the rate of translation of the feed mechanism.

It is a further object of the present invention to provide a feed mechanism in which a piston is disposed between a liquid lubricant and a source of compressed air in which entrapment of air in the liquid lubricant is substantially overcome.

In addition, it is an object of the present invention to provide a suitable valve for metering the flow of liquid from the piston chamber of a drive mechanism for a machine tool in which compressed air is impressed upon one side of a piston and a body of liquid is disposed on the other side of the piston.

It is a further object of the present invention to provide a feed mechanism for a machine tool employing a cylinder and piston for actuating the machine tool and in which a spool valve is utilized to direct compressed air from a compressed air source into communication with one side or the other of the piston and in which the position of the spool valve is controlled by means of a toggle valve actuated in response to the position of the piston or manually.

It is a further object of the present invention to provide an improved toggle valve responsive to any force having a component normal to the actuating member thereof.

It is also an object of the present invention to provide an improved spool valve construction which is simpler and less costly to construct and is particularly adapted for use in the drive mechanism of a machine tool. It is in addition an object of the present invention to provide an improved piston construction in which an O-ring seal is provided between the piston and the cylinder wall which is particularly adapted to seal the interface between a body of liquid and a compressed air region.

Further, it is an object of the present invention to provide a feed mechanism for a machine tool which will translate the machine tool in a first direction at a rapid rate, control the machine tool in the region of the work piece at a slower and controlled rate of translation, and withdraw the machine tool from the work piece at a rapid rate, and perform these functions automatically.

Further, it is an object of the present invention to provide an automatic feed for a drilling machine in which the drill will be driven to the desired depth in a work piece and held at this depth for a period of time to clean the bore.

These and additional objects and advantages of the present invention will be more fully appreciated from a further consideration of this disclosure, particularly when viewed in the light of the drawings, in which:

FIGURE 1 is a side elevational view of a feed mechanism constructed according to the present invention and mounted on a drill press, the drill press being indicated in dashed lines;

FIGURE 2 is a plan view of the automatic feed mechanism illustrated in FIGURE 1, the drill press being omitted for clarity;

FIGURE 3 is a sectional view of the automatic feed mechanism taken along the line 3—3 of FIGURE 1;

FIGURE 4 is a partly elevational view and partly sectional view of the power unit of the automatic feed mechanism of FIGURES 1 through 3, the sectional view being taken along the line 4—4 of FIGURE 1;

FIGURE 5 is a partly elevational view and a partly sectional view of one of the piston and cylinder assemblies of the feed mechanism of FIGURES 1 through 4, the sectional view being taken along the line 5—5 of FIGURE 2;

FIGURE 6 is a sectional view of the housing of the spool valve of the feed mechanism taken along the line 6—6 of FIGURE 4, the spool and sleeve of the valve having been removed for clarity;

FIGURE 7 is a sectional view taken along the line 7—7 of FIGURE 6;

FIGURE 8 is an elevational view of the sleeve for the spool valve illustrated in FIGURE 4;

FIGURE 9 is a sectional view of the sleeve taken along the line 9—9 of FIGURE 8;

FIGURE 10 is an elevational view of the spool of the valve of FIGURE 4;

FIGURE 11 is a sectional view taken along the line 11—11 of FIGURE 2;

FIGURE 12 is a horizontal sectional view of the metering valve illustrated in FIGURES 1 and 2;

FIGURE 13 is a fragmentary sectional view taken along the line 13—13 of FIGURE 3;

FIGURE 14 is a vertical sectional view of the toggle valve taken along the line 14—14 of FIGURE 2;

FIGURE 15 is an elevational view of one of the gaskets illustrated in FIGURE 4;

FIGURE 16 is a plan view of a feed mechanism for a drill press which constitutes another embodiment of the present invention;

FIGURE 18 is a front elevational view of the feed mechanism illustrated in FIGURES 16 and 17;

FIGURE 19 is a vertical sectional view of the power unit of the feed mechanism illustrated in FIGURES 16 through 18;

FIGURE 24 is a sectional view taken along the line 24—24 of FIGURE 23;

FIGURE 25 is a front elevational view of the metering valve assembly illustrated in FIGURES 22 through 24.

Figure 17:
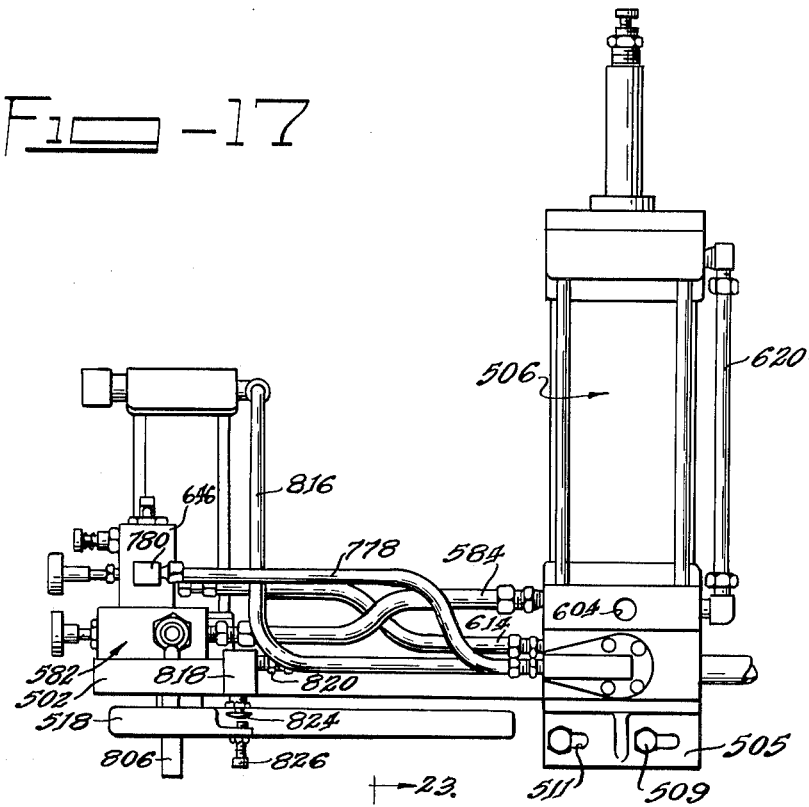
FIGURE 17 is a side elevational view of the feed mechanism illustrated in FIGURE 16.
Figure 22:
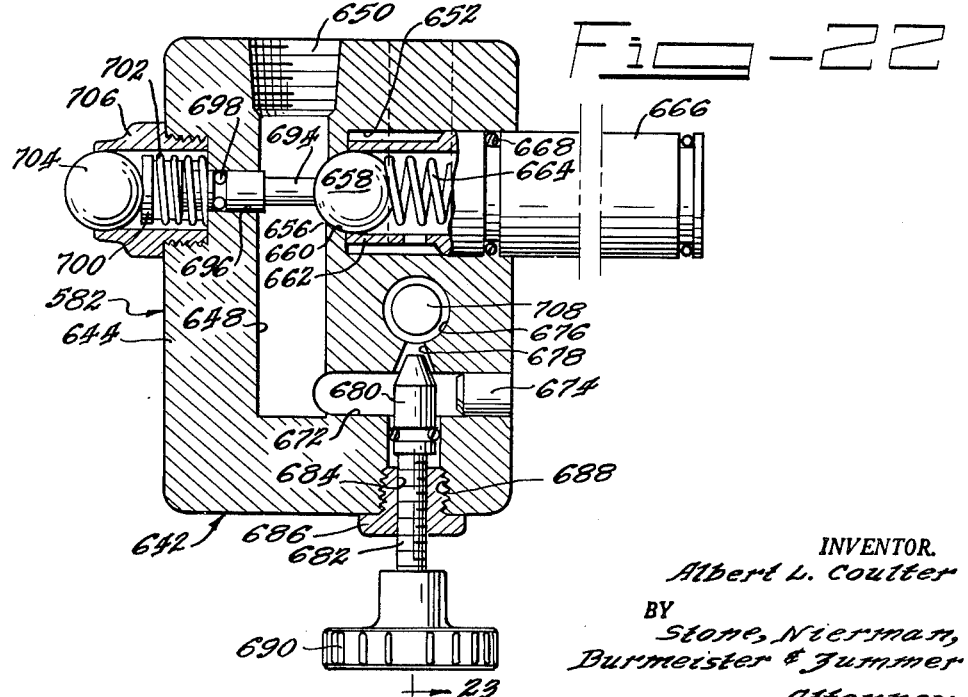
FIGURE 22 is a horizontal sectional view of the metering valve assembly of the feed mechanism illustrated in FIGURES 16 through 21.

FIGURE 1 illustrates a conventional drill press 10 in dashed lines. The drill press 10 has a stand, not shown, which supports a vertical tube 12, and a housing 14 is mounted on the tube 12. The housing 14 supports a drill spindle 16 which is translatably disposed parallel to the tube 12, and the housing 14 also supports an electric motor 18 which is mechanically coupled to the spindle 16 and provides the motor power for the spindle. A drill chuck 20 is mounted on the spindle 16 for positioning and securing a rotatable drill.

As illustrated in the figures, the hydraulic drive assembly for the drill press is illustrated as an attachment to the conventional drill press 10, and it is shown in solid lines. It is to be understood, however, that the hydraulic drive assembly for the drill press may be an integral part of the drill press itself, rather than an attachment. As illustrated, the entire hydraulic drive assembly is mounted on a base plate 22 and mounting plate 24, and the mounting plate 24 is secured on the column 12.

As best illustrated in FIGURE 2, the mounting plate 24 has a semicircular recess 26 which is adapted to be disposed about the tube 12, and a cap 28 with an identical semicircular recess 30 is mounted on the end of the mounting plate 24 and tightened in position by a pair of bolts 32 which are threaded into the mounting plate 24. By tightening up on the bolts 32, the mounting plate 24 is secured on the column 12 of the drill press.

The mounting plate 24 has a slot 34 disposed therein which is aligned with the center of the semicircular recess 26. The base plate 22 has an aperture 36 which accommodates a bolt 38. The bolt 38 extends through the mounting plate 24 and secures the base plate 22 onto the mounting plate 24. The base plate 22 has a pair of ridges 40 which mate with recesses in the mounting plate to maintain the base plate 22 in alignment with the mounting plate 24. In addition, there are two screws 44 which are threaded within the base plate 22 and extend upwardly into abutment with the housing 14 of the drill press. The screws 44 are disposed on opposite sides of the spindle 16 for the purpose of stabilizing the base plate 22 perpendicular to the column 12.

The base plate 22 is generally T-shaped, the leg portion engaging the mounting plate 24 being designated 46 and referred to as a leg portion. In addition, two additional leg portions 48 and 50 extend normally from the end of the leg portion 46. A circular opening 52 is disposed essentially at the junction of the leg portions 46, 48 and 50, and is disposed about the quill 16 of the drill. The quill 16 is free to rotate and translate within the opening 52. A first cylinder and piston assembly 54 is mounted on the leg portion 48, and an essentially identical second piston and cylinder assembly 56 is mounted on the leg portion 50, the piston and cylinder assemblies 54 and 56 being spaced essentially identical distances from the opening 52.

FIGURE 5 illustrates the cylinder and piston assembly 56, and it is to be understood that the cylinder and piston assembly 54 is of similar construction. The cylinder and piston assembly of FIGURE 5 has a base 58 which is provided with a circular groove 60 in one surface thereof. The assembly 56 also has a top 62 which is provided with a circular groove 64 of the same diameter as the circular groove 60, and a cylindrical sleeve 66 extends between the grooves 60 and 64 and is sealed against leakage of fluid pressure between the base 58 and the top 62. The base 58 and the top 62 are both square in shape and of approximately the same dimensions, and four rods 68 extend between the base 58 and the top 62 and are secured thereto by internally threaded lugs 70 which are provided with protruding caps 72 which abut against the base 58 and top 62.

The base 58 has a circular central recess 74 which terminates at its lower end in a circular aperture 76. A circular bearing 78 is sealed within the aperture 76, and a rod 80 is journaled within the bearing 78. The rod 80 extends to the exterior of the assembly 56 at one end, and has a piston 82 mounted at the other end by a nut 84. The piston 82 is in the form of a flat solid metal circular disc, and it is provided with a circular groove 86 which extends about the perimeter of the disc 82. The groove 86 contains an O-ring 88 which slidably abuts the interior surface of the sleeve 66. The curvature of the inner portion of the groove 86 has been found to be critical in order to prevent air from passing, and is approximately equal to the curvature of the O-ring, this portion being designated 90. The distance between this portion 90 of the groove 86 and the confronting surface of the sleeve 66 is less than the diamter of the O-ring. The dimensions of the groove 86 and spacing of the groove from the surface of the cylinder 66 have been found to be critical in order to prevent air from passing the piston. The O-ring 88 must substantially fill the groove 86, and when a circular O-ring is used, the diameter of the cross-section of the groove may be no greater than ten thousandths of an inch greater than the actual diameter of the O-ring when at rest, and not less than the diameter of the O-ring. A greater curvature of groove 86 permits the O-ring to roll, and pass air into the oil. Also, the O-ring 88 must be at least one half disposed within the groove 86. In one particular construction, the sleeve 66 has a diameter of 2.00 inches, the disc 82 has a diameter of 1.985–1.990 inches, the groove 86 has an inner diameter of 1.600 to 1.605 inches and a cross-section with a diameter of 0.218 inch, and the O-ring 88 has an inner diameter of 1.600 inches and a cross-sectional diameter of 0.210 inch in its rest state. In this manner, the O-ring is prevented from rolling in the groove 86 of the piston 82 as the piston is translated within the sleeve 66. As a result, leakage of liquid from one side of the piston to the other is avoided.

The leg portion 50 of the base plate 22 is provided with an aperture 92 (FIGURE 5) immediately confronting the assembly 56, and the bearing 78 extends through the aperture 92. The base 58 of the assembly 56 is mounted on the base plate 22 by means of bolts 94 which are threaded into the base 58. The rod 80 extends through the bearing 78 to the exterior of the assembly 56 and terminates in a shaft 96 of smaller diameter than the rod which is provided with threads 98 at one end thereof.

The top 62 of the assembly 56 is provided with a recess 100, and a first opening 102 communicates with the recess 100. A second opening 104 also communicates with the recess 100, and a tube 106 is sealed within the opening 104 of the assembly 56 and extends to the corresponding opening of the assembly 54 (FIGURE 2) to interconnect the tops 62 of the two assemblies 54 and 56 together. In like manner, the base 58 of the assembly 54 is provided with a bore 108, and a tube 110 (FIGURES 2 and 5) interconnects the recess 74 of the assembly 56 to a corresponding recess in the assembly 54, thereby interconnecting the bottoms of the assemblies 54 and 56.

The mounting plate 24 is also provided with an outwardly extending support plate 112 which extends normal to the leg portion 46 of the base plate 22. The support plate 112 supports and mounts a power unit 114 which is illustrated generally in FIGURES 1 and 2 and shown in detail in FIGURES 4, 6, 7, 8, 9 and 10. The power unit 114 converts pneumatic pressure from an air line to hydraulic pressure. The air line is indicated at 116 (FIGURES 1 and 2), and is illustrated connected through a water filter 118 and a pressure regulator and guage 120.

The power unit 114 has four separate parts, a base 122, a cylinder 124, an upper manifold 126, and a valve housing 128. The base 122 has a recess 130 which communicates with an aperture 132. The aperture 132 is sealed to a tube 134 which is connected to a metering valve 136. The metering valve 136 is shown in section in FIGURE 12, and FIGURE 12 also indicates the manner in which the metering valve 136 is coupled to the base 58 of the assembly 56.

The base 122 of the power unit 114 is also provided with a cylindrical lip 138 which extends about the upper surface of the base 122, and the cylinder 124 is disposed within the recess formed by the lip 138 and forms a fluid seal therewith. The upper manifold 126 also has a lip 140 which protrudes downwardly therefrom and extends above the upper end of the cylinder 124. The upper manifold 126 also has a recess 142 which extends therein, and a channel 144 extends to the upper surface 146 of the upper manifold.

In addition to the channel 144, there are three additional channels 148, 150 and 152 which extend normally into the upper manifold 126 from the surface 146, the channels 144, 148, 150 and 152 opening to the surface 146 along a common axis disposed centrally of the surface 146 and on the axis of the cylinder 124. The channel 148 is connected with an opening 154 to the exterior of the manifold 126. The channel 152 communicates with an opening 158 on the side of the manifold 126 opposite the opening 154, and a relief valve 156 is mounted in the opening 158 and communicates with the ambient atmosphere. The passage 150 also communicates with an opening which is connected to a tube 166 (FIGURE 1). The tube 166 communicates with the opening 102 of the cylinder and piston assembly 56.

The valve housing 128 also has a flat surface 168 which is mounted in abutment with the surface 146 of the upper manifold 126, and the valve housing 128 has apertures 170, 172, 174 and 176 which are aligned with the openings of the passages 148, 150, 144, and 152, respectively. The valve housing 128 also has a cylindrical cavity 178 which extends therethrough parallel to the line of the openings of the passages in the surface 168, and circular grooves 180 extend coaxially about the surface of the cylindrical cavity 178 confronting each of the apertures 170, 172, 174 and 176. A hollow cylindrical sleeve 182 (FIGURES 4, 8 and 9) is disposed within the cylindrical cavity 178, and the sleeve 182 has a groove 184 extending coaxially about the sleeve 182 confronting each of the grooves 180 in the valve housing 128. In addition, the sleeve 182 is provided with a plurality of perforations 186 confronting each of the grooves 180, and the perforations 186 provide communication between the circular cavities formed by the combined grooves 180 and 184 and the interior of the sleeve 182.

A spool 188 (FIGURES 4 and 10) is slidably disposed within the sleeve 182. The spool 188 has a first recess 190 spaced from a second recess 192, the recess 190 being positioned to couple the passage 150 to either the passage 148 or a central circular cavity 194 formed by a central groove 180 in the valve housing 128 in a central groove 184 in the sleeve 182. This circular cavity 194 is in communication with an opening 196, as illustrated in FIGURE 6, and the opening 196 is connected to the compressed air supply line 116, as illustrated in FIGURES 1 and 2.

The sleeve 182 has a groove 198 with a rectangular cross-section confronting the surface of the cylindrical cavity 178 on both sides of each of the grooves 180 therein, and an O-ring 200 is disposed in each groove 198 to form a fluid seal. The ends of the sleeve 182 are provided with a circular recess 202 on the exterior surface thereof, and a notch 203 is disposed between this recess 202 and the cylindrical interior surface of the sleeve 182. A channel 204 extends through the valve housing 128 parallel to the cavity 178 and adjacent to the cavity 178, and this channel 204 communicates with the opening 196 and the circular cavity 194, as illustrated in FIGURE 6. The ends of the cavity 178 are closed by end plates 206 and 208, and a gasket 210 is disposed between the valve housing 128 and the end plate 206 and a second gasket 212 is disposed between the valve housing 128 and the end plate 208.

The gaskets 210 and 212 are identical in construction and are illustrated in FIGURE 15. Each of these gaskets has a circular opening 214 at the center thereof which is aligned with the axis of the cavity 178 and a notch 216 extending from the circular opening 214. The notch 216 extends into communication with the channel 204 and couples the channel 204 with the ends of the cavity 178. As a result, the interior of the sleeve 182 is coupled through the notches 203 in the ends of the sleeve 182 and the notches 216 in the gaskets 210 and 212 to the channel 204.

The spool 188 is provided with protruding portions of circular cross-section on opposite sides of each of the circular recess portions 190 and 192, these protruding portions being designated 218, 220 and 222, as illustrated in FIGURE 10. Each of these protruding portions 218, 220 and 222 is provided with a pair of grooves 224, and each of the grooves is provided with an O-ring 226. In this manner, the spool 188 is slidably disposed within the sleeve 182 and sealed against passage of fluid pressure. The end plate 206 has an opening 228, and a tube 230 is sealed to the opening 228. The tube 230 is also sealed to a valve 232 which is mounted on the base plate 22, the valve 232 is illustrated in FIGURE 11 and will be further described hereinafter.

The end plate 208 has an opening 234, and a tube 236 is sealed to the opening 234 and extends to a valve 238 also mounted on the base plate 22. This valve 238 is illustrated in FIGURE 14 and will also be described hereinafter.

It will be noted from FIGURE 1, that a drive plate 240 is secured on the quill 16 of the drill press 10, and this drive plate 240 is illustrated in FIGURES 1 and 3. The shafts 96 of each of the cylinder and piston assemblies 54 and 56 extend through apertures 242 in the drive plate 240, and are secured in position by nuts 244, as illustrated in FIGURE 5. The drive plate 240 is thus translated in a vertical direction by the cylinder and piston assemblies 54 and 56.

The drive plate 240 has a circular opening 246 which is disposed about the quill 16 of the drill press 10. A slot 248 extends from the edge of the drive plate 240 to the opening 246, and a bolt 250 is employed to tighten the bifurcated portions of the drive plate 240 formed by the slot 248 about the quill 16. It is to be noted that the quill 16 is not rotatable, but that the chuck 20 of the drill press is rotated by a shaft disposed within the quill and designated 252.

As stated above, FIGURE 11 shows in detail the valve 232 and illustrates the valve mounted on the base plate 22 by means of two screws 254. The valve 232 has a valve block 256 provided with a bore 258 which extends into the block 256 normal to the plane of the base plate 22. A second bore 260 intersects the first bore 258 normally, and the tube 230 is sealed within the mouth of the second bore 260. The mouth of the first bore 258 is located at the lower side of the block 256 in alignment with the lower surface of the base plate 22, and the mouth is threaded and engages a cylindrical plug 262. The plug 262 has a central bore 264 which flares outwardly at its inner end 266 to form a seat. A pin 268 is slidably disposed within the bore 264, and the end of the pin confronting the seat 266 is provided with an outwardly extending flange 270 having a circular groove 272 extending coaxially about the pin 268 which accommodates an O-ring 274. The O-ring is adapted to abut the outwardly flaring surface 266 or seat and form a fluid tight seal. The plug 262 is also provided with a second bore 276 which extends therein normally through the central bore 264 to provide a passage to the exterior of the plug for exhausting air to the atmosphere. The end of the rod 268 opposite the flange 270 has a cap 278 mounted thereon, and a spring 280 disposed between the cap and a shoulder 282 in the bore 264 spring biases the cap outwardly to force the O-ring 274 into abutment with the seat 266 to provide a fluid tight seal.

Also as illustrated in FIGURE 11, the drive plate 240 has a bracket 284 mounted thereon by bolts 286. The bracket 284 extends outwardly from the drive plate 240 parallel to the plate, and a set screw 288 is threaded through the bracket 284 and aligned with the cap 278 of the valve 232. A pair of lock nuts 290 are mounted on the screw 288 to lock the screw in position.

FIGURE 14 illustrates the details of the valve 238. The valve 238 has a valve block 292 which is provided with a first bore 294 extending therein and a second bore 296 normal to the first bore, the tube 236 being sealed within the mouth of the second bore 296. The mouth of the first bore 294 is threaded with pipe threads, and a plug 298 has pipe threads engaging the threads of the mouth of the first bore 294. The plug 298 has an axial bore 300 which extends therethrough and flares outwardly at its inner end 302 to form a valve seat. A second bore 304 extends into the axial bore 300 normally to form an outlet to the ambient atmosphere. A pin 306 is slidably disposed within the first bore 300, and the pin 306 has an outwardly flaring head 308 provided with a circular groove 310 extending coaxially about the pin 306 which accommodates an O-ring 312. The O-ring 312 is adapted to seat against the outwardly flaring seat 302 of the plug 298.

The plug 298 has a flange 314 which is adapted to engage a wrench for purposes of tightening the plug within the bore 294. The plug 298 also has a tubular threaded portion 316 extending coaxially on the side of the flange 314 opposite the block 292, and a cap 318 has a cylindrical cavity 319 which threadedly engages this tubular threaded portion 316. The cap 318 is provided with a circular opening 320 coaxial with the tubular portion 316 at its end opposite the flange 314, and the opening 320 to the cavity 319. A lever 324 with a semi-spherical end 326 extends from the opening 320, the semi-spherical end being disposed within the cap 318 in abutment with the part-spherical surface 322. The lever 324 terminates in a flat surface 328 adjacent to the semi-spherical surface 326, and this flat surface abuts the flat surface 330 of a plug 332. The plug 332 is slidably disposed within the cavity 319 of the cap 318, and is spring biased outwardly by a helical spring 334 disposed between the end of the cap opposite the lever 324 and a shoulder 336 in the bore 330. The plug 332 has a cylindrical recess 338 extending therein from the side opposite the flat surface 330, and a cylindrical stub 340 is disposed within this recess 338. The pin 306 is mounted on the stub 340 and extends from the end thereof opposite the plug 332, and a spring 342 is mounted between the stub 340 and a second shoulder 344 in the bore 300. In this manner, the spring 342 spring biases the O-ring 312 into abutment with the seat 302, and the lever 324 must be rotated to the position indicated in FIGURE 14 to force the O-ring away from the seat 302 and permit fluid to flow through the bores 294, 296, 300, and 304. The lever 324 may, however, be rotated in any direction to actuate the valve.

FIGURE 12 illustrates the metering valve 136 in detail. The metering valve 136 has a valve block 346 with a channel 348 extending therein which is in communication with the base 58 of the cylinder and piston assembly 56. A stub 349 is sealed within the channel 348 and within an opening 351 in the base 58. In addition, the block 346 has a bore 350 extending therein normal to the passage 348 which is connected to the tube 134, as illustrated in FIGURE 2. The passage 348 is connected to the bore 350 through a restriction 352 which is aligned with a third bore 354. The third bore 354 is threaded adjacent to its mouth, and a control rod 356 threadedly engages the bore 354. The end of the rod 356, designated 358, is tapered and engages the restriction 352 to control the flow of liquid through the restriction 352. An O-ring 359 is disposed in a groove about the rod 356 and engages the surface of the third bore 354 to form a fluid seal therewith. A knob 360 is mounted on the end of the rod 356 opposite the restriction 352 for adjusting the rod. A bushing 362 is disposed about a portion 363 of the rod of smaller diameter and the bushing 362 threadedly engages the opening.

The bore 350 also is provided with an offset 364, and a second restriction 366 is disposed between the offset 364 and the passage 348. A bore 368 is aligned with the second restriction 366, and a ball 370 is disposed in abutment with the restriction 366 by means of a plug 372 which confronts the ball 370 and a spiral spring 374 disposed about the cylindrical end 376 of the plug 372 which urges the ball 370 into the restriction 366.

A bore 378 aligned with the bore 368 slidably accommodates a rod 380. The rod 380 is mounted on a cap 382 which is spring biased outwardly by a spiral spring 384 mounted about the rod 380 between the cap 382 and a shoulder 386 in the bore 378. The cap 382 is slidably disposed within a cylindrical channel 388 in a plug 390 which threadedly engages the mouth of the bore 378. A ball 392 is disposed within the channel 388 of the plug 390 in abutment with the cap 382. When the ball 392 is depressed, the rod 380 forces the ball 370 from the restriction 366, thereby permitting fluid pressure to flow through the passage 348, the restriction 366, the extension 364 and the bore 350.

The drill press operation may be described in the following manner. The cylinder 124 is substantially filled with a body of oil, for example to the level indicated by the line 394 in FIGURE 4, the body of oil being designated 396. Compressed air from the line 116 enters through the valve housing 128 into the annular cavity 194. By actuating the lever 324 of the valve 238, air from the tube 236 is exhausted to the ambient atmosphere, thus permitting the spool 188 to slide toward the end plate 208 and connect the annular cavity 194 through the channel 144 with the interior of the cylinder 124 of the power unit 114. At the same time, the spool 188 connects the channel 150 and tube 166 with the opening 154 of the upper manifold, thus permitting any air in the upper portion of the cylinder and piston assemblies 54 and 56 to be exhausted to the ambient atmosphere. As a result, the pistons 82 are forced upwardly in the cylinders 66 of the cylinder and piston assemblies 54 and 56, and the drive plate 240 is raised forcing the quill 16 upwardly.

When the drive plate 240 rises sufficiently to cause the screw 288 to contact the cap 278 of the valve 232, as illustrated in FIGURES 2 and 11, the valve 232 is opened permitting the air in the tube 230 to be exhausted to the ambient atmosphere, and hence air at the end of the spool 188 adjacent to the end plate 206 is also exhausted. As a result, the spool 188 is translated toward the end plate 206 due to the larger air pressure exerted at the opposite end of the spool 188. Hence, the circular cavity 194 becomes connected with the channel 150, thus connecting the compressed air from the line 116 through the tube 166 to the upper side of the pistons 82 of the cylinder and piston assemblies 54 and 56. The compressed air from the line 116 thus tends to drive the pistons 82 downwardly forcing the quill toward the work piece. In order for the pistons 82 to move, the oil which is disposed in the cylinders on the opposite or lower side of the pistons 82 must be transported back to the power unit 114. The oil from the cylinder and piston assembly 54 flows through the tube 108 to the cylinder and piston assembly 56, and hence into the passage 348 of the metering valve 136 (FIGURE 12). The flow of oil is against the ball 370 confronting the restriction 366, and hence cannot flow through this restriction but must flow between the rod 356 and the restriction 352. As a result, the speed of the quill 16 in its downward movement is controlled by the knob 360. The oil flows outwardly through the bore 350 from the metering valve 136, through the tube 134, and into the aperture 132 in the base 122 of the power unit 114.

The lower limit of travel of the drive plate 240, and hence the quill 16 of the drill press, is determined by means of a post 395 (FIGURES 2 and 3) mounted on the drive plate 240 and extending upwardly therefrom through an aperture 397 in the base plate 22. The end of the post 395 opposite the drive plate 240 is threaded and carries a pair of lock nuts 398 which form an adjustable stop. The post 395 is aligned with the lever 324 of the valve 238, and the lock nuts 398 confront the lever 324. As a result, movement of the drive plate 240 downwardly moves the lock nuts 398 into abutment with the lever 324 and actuates the valve 238. Since the position of the lock nuts 398 is adjustable, this action takes place at the selected distance between the drive plate 240 and the base plate 22. Actuation of the valve 238 drops the air pressure in the end of the cylindrical cavity 178 adjacent to the end plates 208, and results in the spool 188 sliding toward this end of the cavity 178 within the sleeve 182 automatically to reverse the cycle.

A knob 400 is slidably mounted on a rib 402 located at the front of the base plate 22, and the knob 400 is attached to a pin 404 which is aligned with the lever 324 of the valve 138. The rib 402 is provided with a cylindrical recess 406 confronting the knob 400, and a spiral spring 408 is disposed within the recess 406 and urges the knob outwardly. The knob 400 may be compressed against the spring 408 to cause the pin 404 to abut the lever 324 and actuate the valve 238. This mechanism provides a manual means for stopping the downward travel of the drive plate 240 and the quill 16 of the drill press.

Movement of the quill 16 of the drill press 10 in the forward or downward direction may be at a maximum speed or a speed controlled by the knob 360 of the metering valve 136, and the mechanism for selecting which of the two speeds is desired is illustrated in FIGURES 1, 2, 3, 12 and 13. The metering valve 136 has a pin 380 controlled by a translatable ball 392, as illustrated in FIGURE 12 and described above. This ball 392 confronts a cam rod 410 which is mounted on the drive plate 240 and extends vertically therefrom. The cam rod 410 is adapted to force the ball 392 inwardly, thereby removing the ball 370 from the second restriction 366 and permitting liquid lubricant or oil from the piston and cylinder assemblies 54 and 56 to flow through the passage 348, and through the restriction 366 to the power unit 114 rather than flowing past the metering pin 356 and through restriction 352. As a result, the drive plate 240 may be translated downward at a maximum rate.

FIGURES 1, 3 and 13 illustrate the construction of the cam rod 410 and its mounting on the drive plate 240. The drive plate 240 has a rectangular notch cut from the lower surface thereof, the notch being designated 412. A cam mounting plate 414 is provided with a mating notch 416 and is mounted in abutment with the notch 412 of the drive plate 240. A bolt 417 passes through an aperture 418 in the cam mounting plate 414 and is threaded within an aperture 420 in the drive plate 240. A spiral spring 422 is disposed between the head of the bolt 417 and the cam mounting plate 414 and urges the cam mounting plate into engagement with the drive plate 240.

The purpose of this structure is to provide a cam mounting plate which is capable of alignment of the cam rod with an opening 424 in the base plate 22 which journals the cam rod 410. The cam rod 410 has at least one region of restricted cross-section, designated 426, and when this region 426 confronts the ball 392, the restriction 366 is closed by the ball 370 of the metering valve 136, and the downward speed of the quill 16 is controlled by the metering valve 136 by means of the valve pin 356 and the restriction 352. As illustrated in FIGURE 13, a second region of restricted cross-section 428 is disposed above the first region 426 on the cam rod 410. With this configuration, the quill 16 of the drill press 10 will advance rapidly through the region of large diameter of the cam rod 410 which is disposed between the first restricted region 426 and the drive plate 240, will move under control of the adjustment knob 360 of the metering valve 136 through the first region of restricted diameter 426, will then again move rapidly downwardly through the region of full cross-section between the two restrictions 426 and 428, and will again move slowly through the second region 428 under control of the metering valve 136 and control knob 360. This permits fast advance to a work piece, slow movement through the work piece consistent with the type of material and the hardness of the drill, a fast advance through a region of the work piece which does not require action of the drill, such as a cavity, and slow advance through a second drilling region.

As compressed air forces the piston 82 downwardly, the liquid or lubricant in the lower portions of the cylinder and piston assemblies is forced back into the reservoir of the power unit 114, thus raising the level 394. There is a tendency for churning of the oil or bubbling of the oil in the reservoir to occur as the oil enters the power unit, and perforated baffle plates 430 and 432 are mounted on the manifold assembly 126 and extend across the indentation 142 parallel to each other to prevent the liquid lubricant from escaping from the power unit. A perforated baffle plate 434 is also mounted on the base 122 of the power unit 114 and extends across the indentation 130 thereof to diffuse the flow of liquid lubricant for the same purpose.

It has been found that it is necessary to maintain the atmosphere in contact with the surface of the body of lubricant 396 in the power unit 114 under pressure in order to substantially eliminate air from becoming entrapped in the liquid lubricant.

The pressure relief valve 156 is for this purpose during the portion of the cycle in which the pistons of the assemblies 54 and 56 are being driven downwardly. Using SAE No. 10 lubricating oil for the body 396 of liquid lubricant, the valve 156 should maintain a pressure of at least 30 pounds per square inch on the body of oil 396 to avoid air entrapment in the oil, and preferably 50 pounds per square inch. The valve 156 must, of course, release at a pressure less than the pressure of the compressed air source, and in the preferred construction described above the line 116 is under a pressure of 80 pounds per square inch.

FIGURES 16 through 26 illustrate another embodiment of the present invention. The automatic feed illustrated in FIGURES 1 through 15 establishes the lower travel limit of the drill press by actuation of the toggle valve 238 and reversal of the spool 188 to reverse the cycle. As a result, this drive mechanism immediately reverses, leaving no time for a drill to dwell and thus clear the terminus of its bore of unwanted materials. Also, the nut 398 (FIGURE 2) is driven into abutment with the surface of the base plate 22 during the period in which the spool 188 reverses, thus placing a strain upon the drive plate 240. Additionally, the depth of penetration of the bore is effected by the degree of strain placed upon the drive plate 240. The embodiment of the present invention described hereafter provides a more definite stop for the depth of penetration of the drill, eliminates strain on the drive plate, and provides an adjustable period of dwell for the purpose of cleaning the bore of the drill.

FIGURES 16, 17 and 18 show the present invention in the form of an attachment for a drill press, although it is to be understood that the present invention may be applied directly to a drill press without being utilized as an attachment, and also has utility with other types of machine tools which are adapted to automatic or power feed. FIGURE 16 shows a mounting plate 500 which is adapted to engage the tube or post of a drill press in the manner of the preceding embodiment, and the mounting plate 500 carries a base plate 502 thereon. The mounting plate 500 also has an arm 504 which extends therefrom and carries a power unit 506. The arm 504 has a depending flange 505 which engages the yoke 507 for engaging the column of a drill press, and bolts 509 extend through slots 511 into the yoke 507. The slots 511 are normal to the column of the drill press to permit the use of the feed device as an attachment for different sizes of drill presses without changing the length of the tubing to the power unit 506. Also, the base plate 502 is provided with a pair of wings 508 and 510 which extend outwardly on opposite sides of a circular opening 512. The circular opening 512 has a sufficient diameter to slidably accommodate the quill of a drill press, and the wings 508 and 510 support piston and cylinder assemblies 514 and 516 equally spaced from and on opposite sides of a plane bisecting normally the axis between the assemblies and passing through the axis of the aperture or opening 512. The piston and cylinder assembly 514 corresponds and is identical to the piston and cylinder assembly 54 of the embodiment of FIGURES 1 through 15, and the piston and cylinder assembly 516 corresponds to and is identical to the piston and cylinder assembly 56 of the previous embodiment, and hence the piston and cylinder assemblies will not be further described. FIGURES 17 and 18 show a drive plate 518 mounted on the ends of the rods of the piston and cylinder assemblies 514 and 516 in a manner similar to the drive plate 240 of the previous construction, and the drive plate 518 serves the same purpose as the drive plate 240 in the previous construction.

Figure 20:
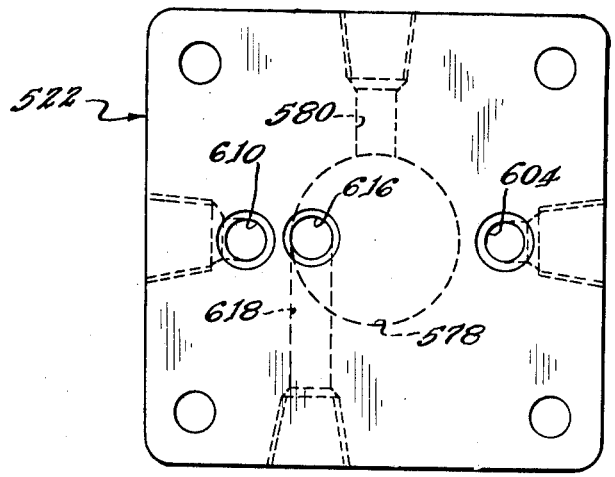
FIGURE 20 is a sectional view taken along the line 20—20 of FIGURE 19.
Figure 21:
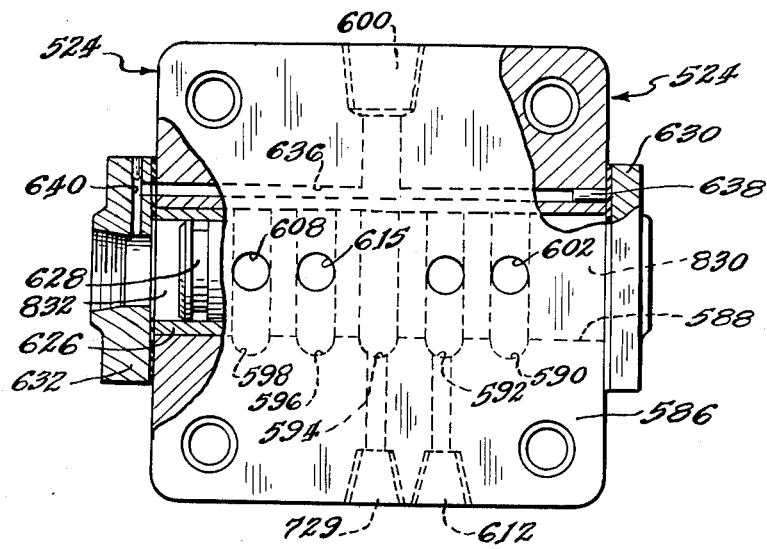
FIGURE 21 is a sectional view taken along the line 21—21 of FIGURE 19.

The power unit 506 is shown in detail in FIGURES 19 through 21. The power unit 506 is to be compared with the power unit illustrated in FIGURE 4, and differs from the power unit of FIGURE 4 in two principal manners. First, a translatable piston is utilized to improve the oil to air separation, and second, the spool valve block has been modified to provide connections to be used in cooperation with other elements of the device differing from those of the earlier construction.

As illustrated in FIGURE 19, the power unit 506 has three separate sections, namely, a piston assembly 520, a manifold 522, and a four-way valve assembly 524. The manifold 522 has a rectangular block 526 with a flat surface 528 at one side which is provided with a circular groove 530. A cylinder 532 has one end disposed within the groove 530 and sealed thereto. The other end of the cylinder 532 is disposed within a groove 534 of an end block 536 and sealed therein. The end block 536 has a large circular orifice 538 on the axis of the cylinder 532, and a piston rod 540 is disposed on the axis of the cylinder 532 and passes through the orifice 538. A circular piston 542 is secured at one end of the rod 540 and is disposed within the cylinder 532. The piston 542 has a circular groove 544 with a particular crosssection disposed confronting the surface of the cylinder 532, and an O-ring 546 is disposed within the groove 544 in abutment with the surface of the cylinder 532 to form a fluid seal therewith. The radius of the O-ring 546 is approximately equal to the radius of the groove 544 in order to form a seal and prevent leakage of air into the lubricant, and the construction duplicates the construction of the piston 82 of FIGURE 5 in this respect. The rod 540 has an axial channel 548 which extends therethrough, and the end of the channel opposite the piston 542 flares outwardly in a threaded mouth 550 which engages a tapering plug 552 threaded on its exterior surface. The plug 552 has a collar 554 which is adapted to accommodate a wrench so that the plug may be firmly seated within the mouth 550. The plug 552 also has a threaded bore 556 which extends therethrough to communicate with the channel 548 of the rod 540, and a threaded bolt 558 engages the threaded bore 556. A lock nut 560 secures the bolt 558 to the plug 552.

A cylindrical bearing structure 562 is disposed about the exterior surface of the rod 540 in the orifice 538 of the end block 536, and the bearing structure 562 is sealed to the end block 536 by an O-ring 564. Also, the bearing structure has an outwardly extending circular flange 566 which abuts the surface of the end block 536 opposite the piston 542, and a cap 568 is provided with a shoulder 570 which engages the flange 566, the cap 568 being secured on the end block 536, for example by bolts not shown. The bearing structure 562 journals the rod 540 in a central channel 572 thereof, and an O-ring 574 and flexible sealing ring 576 form a fluid tight seal between the bearing structure 562 and the rod 540.

The manifold 522 has a circular recess 578 extending from the surface 528 into the block 526, and a passage 580 extends to the exterior surface of the block 526. The passage 580 is connected to a metering valve 582 through a tube 584, as shown in FIGURES 16 and 17.

The four-way valve assembly 524 is best illustrated in FIGURES 19 and 21, and includes a rectangular block 586 which has a bore 588 extending therethrough normal to the passage 580. The bore 588 is also located centrally of the block 586 and has five circular grooves 590, 592, 594, 596 and 598 disposed coaxial about the bore 588 and equally spaced. The central groove 594 is connected to an opening 600 which is in turn connected to the high pressure compressed air source. The groove 590 disposed at one end of the bore 588 has a passage 602 which is aligned with a passage 604 in the manifold 522. The groove 598 at the opposite end of the bore 588 has a channel 608 extending therefrom which mates with a channel 610 in the manifold 522 and which also opens to the ambient atmosphere and may utilize a pressure relief port 606. In place of the pressure relief port, a muffler may be employed in the channel 610.

The groove 592 located between the grooves 590 and 594 is connected to an opening 612 in the block 586 (FIGURE 19), and the opening 612 is also connected to the piston and cylinder assemblies 514 and 516 through a tube 816 as shown in FIGURE 16. The groove 596 located between the grooves 594 and 598 has a channel 615 which mates with a channel 616 terminating in an opening 618 in the block 526 of the manifold 522. The opening 618 is connected by a tube 620 to an opening 622 in the end block 536, and the opening 622 communicates by means of a channel 624 with the orifice 538.

A sleeve 626 is disposed within the bore 588, and a spool valve 628 is slidably disposed within the sleeve 626. End caps 630 and 632 seal both ends of the bore 588 and the sleeve 626. The sleeve 626 has a plurality of perforations 634 confronting each of the grooves 590, 592, 594, 596 and 598.

The construction of the block 586, sleeve 626, and spool 628 may be identical to that shown in FIGURE 4. The block 586 is also provided with a bore 636 which extends longitudinally parallel to the bore 588 for the purpose of interconnecting the opening 600 with the ends of the bore 588. The end of the bore 636 adjacent to the cap 630, however, is closed by a plug 638, and the other end of the bore 636 communicates with the end of the sleeve 626 through a passage 640 disposed within the cap 632. In this manner, the slotted gaskets used in the embodiment previously disclosed and shown specifically in FIGURE 15 are not required, but an ordinary gasket without a slot will suffice.

The metering valve assembly 582 is shown in detail in FIGURES 22 through 25. The metering valve assembly 582 has a block 642 with a rectangular base portion 644 and a rectangular upper structure 646. The base portion 644 is shown in section in FIGURE 22 and has a first bore 648 which extends therein from a threaded mouth 650. The mouth 650 of the bore 648 is connected to the tube 584 which connects the metering valve to opening 580 and the power unit 506. A channel 652 also extends into the block 642 perpendicular to the bore 648 and parallel to the base surface 654 of the block 642, and the channel 652 communicates with the bore 650 through an aperture 656. The aperture 656 is circular in shape, and flares outwardly in a spherical segment to form a seat for a ball 658 which is disposed in the channel 652 and maintained in abutment with the spherical seat, designated 660. A positioning sleeve 662 is disposed about the ball, and anchors a spring 664 which maintains spring pressure urging the ball into abutment with the spherical segment seat 660. A tube 666 is also sealed in the channel 652 by means of an O-ring seal designated 668, and the tube 666 extends to the lower closure of the piston and cylinder assembly 516, designated 670 and illustrated in FIGURE 18.

A second channel 672 also extends from the bore 648 parallel to the channel 652, and the second channel is sealed at its end opposite the bore 648 by a plug 674. A second cylindrical bore 676 with an axis perpendicular to the plane of the first bore 648, first channel 652, and second channel 672 is disposed between the first channel 652 and the second channel 672, and a passage 678 extends from the second channel 672 to the second bore 676, the passage 678 tapering inwardly toward the second bore. A needle valve 680 confronts the tapering passage 678, and the needle valve 680 is provided with a threaded stem 682 which engages a threaded channel 684 of a plug 686. The plug 686 is threaded within an opening 688 in the block 642 confronting the passage 678. A knob 690 is disposed on the end of the threaded stem 682 opposite the needle valve 680, and rotation of the knob controls the flow of liquid lubricant through the restrictions formed by the needle valve 680 in confrontation with the tapered surface of the passage 678.

A perforation 692 extends between the second bore 676 and the channel 652 to permit the flow of liquid lubricant between the channel 652 and the bore 648 through the restrictions formed by the needle valve 680 and the tapering passage 678. This flow of liquid lubricant may be in either direction, but a second flow of liquid lubricant from the bore 648 directly into the passage 652 past the ball 658 may only be in one direction. Further, an actuator rod 694 disposed normal to the bore 648 in a plane parallel to the plane of the base surface 652 of the block 642 extends through an opening 696 in the base 644 of the block 642. The actuator rod 694 is sealed against the passage of liquid lubricant by an O-ring seal 698, and the end of the actuator rod 694 opposite the ball 658 terminates in an enlarged head 700. A spring 702 is disposed between the head 700 and the confronting surface of the base 644 to spring bias the actuator rod 694 in the direction away from the ball 658, and a second ball 704 is mounted within a ball retaining housing 706 which threadedly engages the opening 696 of the block 642, so that the application of a force on the ball 704 actuates the actuator rod 694 to translate the ball 658 and open the passage between the spherical segment seat 660 and the first channel 652.

The bore 676 contains a spool 708 which terminates at one end in a shaft 710, the shaft 710 extending through the mouth of the second bore 676. The mouth of the second bore 676 is threaded, and a bushing 712 threadedly engages the mouth of the second bore 676 and is provided with a central circular channel 714 which accommodates the shaft 710. The spool 708 is provided with three sections 716, 718 and 720 of expanded diameter, and two sections of restricted diameter disposed between these sections of expanded diameter. The section 716 is disposed adjacent to the shaft 710, and contains an O-ring 722 which forms a seal to the surface of the second bore 676. The section 720 is disposed at the other end of the spool 708 and contains two spaced grooves which accommodate O-rings 724. The central expanded section 716 also has a groove which accommodates an O-ring 726. A spiral spring 728 is disposed in the second bore 676 abutting the end of the spool 708 opposite the shaft 710 and urging the spool upwardly.

The expanded section 720 of the spool 708 is positioned sufficiently remote from the base surface 654 of the block 642 to permit liquid lubricant to flow through the passage 678 into the second bore 676 and through the channel 692 into the channel 652 when the spool 708 is translated to its position most remote from the surface 654. This is the position in which the spool is disposed when compressed air is being applied to the cylinder assemblies 514 and 516 in order to translate a drill in the forward direction.

As indicated in FIGURES 17 and 19, the tube 614 is connected between a passage 729 of the four-way valve assembly 524 and the upper structure 646 of the metering valve assembly 582. The passage 729 communicates with the groove 594 and hence the compressed air source. The tube 614 is connected into an opening 730 in the valve assembly 524 which communicates with the second bore 676 in a position located between the regions of expanded diameter 718 and 720 in all positions of the spool 708. A manually actuable poppet valve 732 is also mounted in an opening 734 communicating with the bore 676 in this same region between the regions of expanded diameter of the spool 718 and 720 for all positions of the spool, and the valve 732 is provided with openings 736 to the ambient atmosphere located in a sleeve 738. The sleeve 738 is mounted in the opening 734 and provides a valve seat 740 for a valve member 742 secured at the end of a stem 746. The stem 746 is mounted on a button 748. A spiral spring 750 which is disposed about the stem 746 between the button 748 and a shoulder 752 of the plug 738 maintains the valve member 742 in abutment with the valve seat 740 unless the button 748 is depressed to permit air to pass outwardly through the aperture 736.

Immediately above the opening 734 in the upper structure 646 of the block 642 is a second opening 754 which contains a controllable pressure relief valve 756. The valve 756 has a cylindrical sleeve 758 which is threaded at one end and engages threads on the opening 754. The opening 754 has a restricted portion 760 which communicates with the second bore 676 between the expanded portions of the spool 708 designated 716 and 718 for all positions of the spool 708 within the second bore 676. The sleeve 758 has a passage 762 which extends therethrough and communicates with the bore 760, and the passage 762 has a mouth 764 of restricted diameter. A valve member 766 confronts the mouth 764 and has a stem 768 which extends therefrom to a threaded cylindrical portion 770 which engages the threads on the interior surface of the channel 762. A knob 772 is disposed at the end of the cylindrical portion 770, and a spiral spring 774 extends between the knob and the end of the sleeve 758 to resist rotation of the cylindrical portion 770 within the channel 762. By rotation of the knob, the valve member 766 may be brought into closer proximity to the mouth 764 of the sleeve 758 to restrict the flow of air through the sleeve. Openings 776 located immediately adjacent to the threaded region of the sleeve 758 permit air to escape to the ambient atmosphere at the controlled rate.

Figure 23:
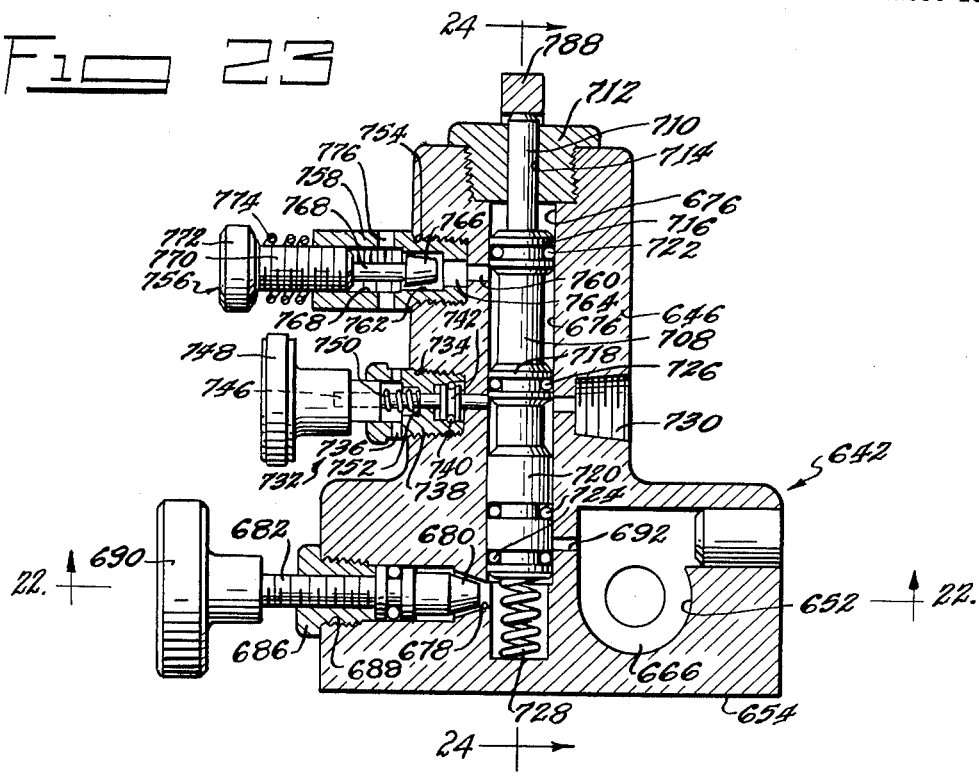
FIGURE 23 is a sectional view taken along the line 23—23 of FIGURE 22.

FIGURE 24 shows still another opening in the upper structure 646 of the block 642, and this opening comprises a plurality of small bores 777 which extend through the upper structure 646 into the second bore 676 in the region between the openings 734 and 754. As is more clearly shown in FIGURES 16 through 19, a tube 778 is connected to the bore 777 at one end by means of a connector 780, the other end of the tube 778 being connected to the opening 781 in the cap 630 of the four-way valve assembly 524. The apertures 777 are positioned sufficiently close to the opening 730 to communicate therewith when the spool 708 is in its uppermost position but the region of expanded diameter 718 is interposed between the apertures 776 and the opening 730 when the spool 708 is in its lowermost position (as shown in FIGURE 23) to seal these openings from each other.

A lever arm 782 is slidably mounted on the side 784 of the block 642. The lever arm has a central portion 786 which is in slidable abutment with the surface 784, and end portions 788 and 790 which extend from the central portions 786 in opposite directions and normally to the central portion 786. The end portion 788 extends over and confronts the end of the shaft 710 of the spool 708, and is adapted to depress or translate the spool 708 in the second bore 676. The central portion 786 of the lever arm 782 is disposed within a yoke 792 which is secured to the surface 794 by a pair of screws 796. FIGURES 16 and 18 illustrate the manner of mounting the metering valve assembly 582 and its association with the other elements of the feed mechanism. The drive plate 518 carries a threaded bolt 798 with a slot which extends upwardly therefrom and is journaled within an aperture 800 in the base plate 502. A stop nut 802 formed of a nut 803a and cap 803b is disposed on the bolt 798. The nut 803a is threaded on the bolt and the cap 803b is journaled thereon and provided with a key preventing rotation and a locking screw 804 to prevent the stop nut from further rotation once it is locked in position. The end portion 790 of the lever arm 782 is disposed adjacent to the screw 798, so that the lock nuts 802 will engage the end portion 790 and translate the lever arm 782 downwardly in response thereto.

It is also to be noted that a pin 806 is mounted on the drive plate 518 and locked in position by a lock screw 808. The pin 806 extends perpendicular to the drive plate 518 and passes through an opening 810 in the base plate 502. The pin confronts and is adapted to engage the ball 704 of the metering valve assembly 582, and thus actuate the ball 658 of this assembly.

It is to be noted that the piston and cylinder assemblies 514 and 516 are connected in cascade, that is, a tube 812 interconnects the upper portions of the cylinders, and a second tube 814 interconnects the lower portions of the cylinders. Hence, the piston and cylinder assemblies act in unison. It is also to be noted that the upper ends of the cylinder and piston assemblies 514 and 516 are connected through a tube 816 to the opening 612 of the four-way valve assembly 524. The lower end of the cylinders are connected through the tube 666 to the metering valve assembly 582, as previously stated.

As illustrated in FIGURE 17, a poppet valve assembly 818 is mounted on the base plate 502 on the side thereof confronting the power unit 506, and the poppet valve assembly is connected by a tube 820 to the opening 822 in the cover 632. The poppet valve assembly 818 has an actuation member 824 which confronts an adjustable screw 826 mounted on the drive plate 518, so that the drive plate opens the poppet valve 818 when the screw 826 engages the actuation member 824 to open the tube 820 to the ambient atmosphere.

Figure 26:
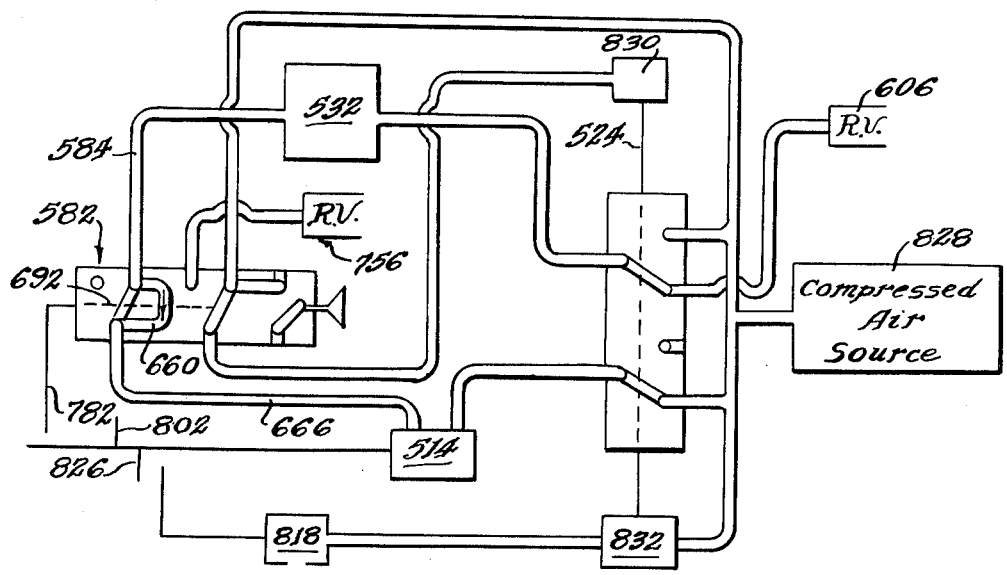
FIGURE 26 is a diagrammatic view illustrating the hydraulic and mechanical connections for the feed mechanism illustrated in FIGURES 16 through 25.

Operation of the feed mechanism as utilized on a drill press will be more readily understood by reference to the diagrammatic showing of FIGURE 26. In order to place the unit in operation, the plug 552 is removed from the mouth 550 of the rod 540 of the power unit 506, and the unit is filled with oil. The entire power unit 506 on the lower side of the piston 542, and the portions of the piston and cylinder assemblies 514 and 516 below the pistons must be bled of all air and replaced by a liquid lubricant. Thereafter, the plug is replaced, and after complete bleeding of air from the system has occurred, the bolt 558 is locked in position. Should further bleeding become necessary during operation of the unit, it is only necessary to remove the bolt 558.

Assuming the spool 628 of the four-way valve assembly 524 is positioned adjacent to the cap 632, so that the compressed air source is connected through the port 612 and the tube 816 to the upper side of the piston and cylinder assemblies 514 and 516, compressed air from the compressed air source will exert a downward thrust upon the pistons in the piston and cylinder assemblies 514 and 516. In FIGURE 26, the compressed air source has been designated 828, and the four-way valve assembly 524 is diagrammatically illustrated in this position. In FIGURE 26, solid single lines indicate mechanical association, and double lines indicate pneumatic or hydraulic tubing. The lower end of the piston and cylinder assemblies 514 and 516 are connected to the meter valve assembly 582 through the stub tube 666, and the liquid lubricant in the lower portion of these piston and cylinder assemblies flows through the meter valve formed by the passage 692, stem 680 and the tapered passage 678 of the metering valve assembly 582 to enter the cylinder 532 by means of the tube 584. As a result, the piston 542 within the cylinder 532 rises forcing the air from the upper portion of the cylinder 532 to exit through the channel 618, flow through the groove 596 to the groove 598, and hence through the channel 608, the channel 610 to the ambient atmosphere. In FIGURE 26, the four-way valve assembly 524 is shown making this connection, and the exhaust port 606 is indicated as a relief port in that it will open only when subjected to an adequate pressure, however, the relief port 606 is for the purpose of controlling the rate of drive and not for the purpose of compressing the liquid lubricant to avoid air entrapment. The power unit 506 of FIGURE 19 forms a sealed system and avoids air entrapment in the liquid lubricant.

As a result of this action, the piston rods of the piston and cylinder assemblies 514 and 516 are translated downwardly driving the drive plate 518 which carries the bolt 798 and its associated lock nut 802, which is indicated diagrammatically in FIGURE 26. When the lock nut 802 abuts the lever arm 790, also diagrammatically illustrated in FIGURE 26, the spool 708 of the metering valve assembly 582 will be translated to reverse the connections therein. As a result, the following actions take place. First, flow of liquid lubricant from the portions of the piston and cylinder assemblies 514 and 516 below the pistons thereof is stopped, since the spool 708 blocks passage of the flow of lubricant through the passage 692 and the flow is not in the direction permitted by the ball 658 and its spherical segment seat 660, indicated by the arrow in FIGURE 26. This arrests further movement of the pistons within the piston and cylinder assemblies 514 and 516 and positively limits translation of the drive plate 518, and thus the depth of the bore which will be achieved by the automatic feed of the drill press.

Second, the end of the chamber of the four-way valve assembly 524 adjacent to the end plate 630, designated as chamber 830, is now connected by means of the spool 708 to the metered valve exhaust 756 which slowly permits the air pressure within the chamber 830 to decline. However, the other end of the spool 628 of the four-way valve assembly 524, designated as chamber 832, is directly connected to the compressed air source 828, and when the pressure difference between the chamber 832 and the chamber 830 becomes sufficient to overcome frictional forces, the spool 628 will be translated toward the end cap 630. However, a time delay is introduced by the valve 756 which delays the flow of air from the chamber 830 to the ambient atmosphere, and during this delay, the drill will continue to rotate at the point of its deepest penetration, thus providing a dwell period for the purpose of cleaning the drilling bore.

As soon as the pressure in the chamber 832 exceeds the pressure in the chamber 830 sufficient to translate the spool 628 of the four-way valve assembly 524, the four-way valve assembly 524 will connect the compressed air source to the upper portion of the cylinder 532 of the power unit 506. This is accomplished since the spool 628 connects the groove 594 with the groove 596, and hence connects the compressed air source with the opening 622 in the end block 536 of the power unit 506. At the same time, the spool 628 connects the upper portions of the piston and cylinder assemblies 514 and 516 to the ambient atmosphere through the exhaust port 604. Liquid lubricant will now be forced from the power unit 506 through the tube 584 and through the bypass of the metering valve assembly 582 to drive the pistons of the piston and cylinder assemblies 514 and 516 upwardly. The bypass of the metering valve assembly 582 is achieved by means of the ball 658 on its spherical segment seat 660 which will permit the flow of liquid lubricant from the bore 648 into the tube 666. Movement of the pistons of the piston and cylinder assemblies 514 and 516 releases the metal arm 782, thus permitting the spring 728 to return the spool 708 in the second bore 676 to its uppermost position. In this manner, the connections diagrammatically illustrated in solid lines in FIGURE 26 for the metering valve assembly 582 are restored, but it is to be noted that liquid lubricant continues to flow from the power unit 506 to the cylinder and piston assemblies 514 and 516 through the bypass of the meter valve assembly 582.

When the piston rods of the piston and cylinder assemblies 514 are translated upwardly sufficient to cause the screw 826 carried by the drive plate 518 to actuate the valve 818, hence exhausting air from the chamber 832 at the end of the spool 628, the spool 628 will be translated to the position indicated in FIGURE 26. Pressure accumulating in the chamber 830 by means of the connection of this chamber through the metering valve assembly 582 to the compressed air source 826 accomplishes this translation. The unit is then ready for its next cycle.

From the foregoing disclosure, those skilled in the art will devise many modifications of the present invention within its intended scope, and will also apply the present invention to many devices other than drill presses. For example, the present invention may also be applied to automatic feed for power saws, automatic feed for lathes, automatic feed for milling machines, and many other types of equipment. The dwell time provided for the drill press of FIGURES 16 through 26 may also be used to advantage for hot stamp machines, spot welding machines, and other types of equipment requiring a period of time to complete a cycle. It is therefore intended that the scope of the present invention be not limited by the foregoing disclosure but rather only by the appended claims.

The invention claimed is:

1. A drive mechanism for translating a tool of a machine tool comprising, in combination: a frame adapted to be mounted on the machine tool; a cylinder mounted on the frame having a first closure at one end thereof and a second closure at the other end thereof, each of said closures having an opening therein and the first of said closures having an aperture therein forming a bearing surface; a piston slidably disposed within the cylinder forming a fluid seal with the cylinder; a rod mounted on the piston and journaled within the aperture of the first closure of the cylinder; a reservoir having a first and a second end closure at the ends thereof, each end closure being provided with an orifice therethrough; two position valve means having a first port adapted to be connected to a compressed air source, a second port in communication with the atmosphere, a third port connected to the opening in one of the closures of the cylinder, and a fourth port connected to the orifice in the first end closure of the reservoir, one position of said valve means connecting the first port thereof to the third port thereof and the second port thereof to the fourth port hereof, and the other position of said valve means connecting the first port thereof to the fourth port thereof and the second port thereof to a third port thereof; a metering valve including a housing having a passage extending therethrough from a first port to a second port, the first port being connected to the opening in the other end closure of the cylinder and the second port being connected to the orifice in the second end closure of the reservoir, said passage having a restriction therein, a valve stem extending into the restriction and positionable therein to restrict the flow of liquid lubricant through the restriction, said valve stem being actuable from exterior of the housing, said housing having a direct opening into the passage at both ends of the duct and on opposite sides of the restriction to form a bypass about said restriction, and a one-way flow control valve disposed in said duct to permit liquid lubricant to flow from the reservoir to the cylinder without passing through the restriction of the passage.

2. A drive mechanism for a machine tool comprising the elements of claim 1 wherein the one-way flow control valve is provided with means responsive to positioning of a control member for locking the one-way flow control valve in open position, said control member extending to the exterior of the housing and being actuable therefrom, and a cam mechanically coupled to the rod of the piston mounted adjacent to and adapted to engage the control member of the one-way valve locking means to lock the one-way valve in open position for a portion of the travel of the rod.

3. A drive mechanism for translating the quill of a drill press having a mounting frame, a translatable quill, a shaft journaled within the quill, a chuck mounted on the end of the shaft for carrying a drill, and a motor for rotating the shaft comprising the combination of claim 1 wherein a pair of cylinders are mounted on the frame and disposed with their central axes parallel to the shaft and parallel to each other, said axes of the cylinders being equidistant from the axis of the shaft, each of said cylinders having a first closure at one end thereof and a second closure at the other end thereof, the first closure being disposed in a first plane normal to the shaft and the second closure being disposed in a second plane parallel to the first plane, each of said first and second closures having an opening therein and each first closure having an aperture therein disposed on the axis of the cylinder forming a bearing surface, the openings in the first closures being interconnected and the openings in the second closures being interconnected; a cylindrical piston slidably disposed within each cylinder; a rod mounted on each piston at its center and journaled within the aperture of the first closure of each cylinder, and a plate-shaped yoke mounted on the rods exterior of the cylinders, said yoke being mounted on the quill and disposed parallel to the plane of the first closure of the cylinders.

4. A drive mechanism for translating a tool of a machine tool comprising the elements of claim 1 wherein the duct of the metering valve is provided with a spherical shoulder therein and the one-way flow control valve includes a spherical ball of the same radius as the spherical shoulder disposed in the duct confronting and adapted to seat upon the shoulder of the duct.

5. A drive mechanism for a machine tool comprising the elements of claim 4 wherein the one-way flow control valve includes an aperture through the housing confronting the spherical shoulder of the duct and on the side of said shoulder opposite the ball, a rod journaled in the aperture having an end confronting the spherical shoulder of smaller cross-section than the diameter of the duct at said shoulder, said rod being translatable into the duct in the region of the spherical shoulder and adapted to abut the ball and force the ball from the spherical shoulder, means urging the rod away from the spherical shoulder, and mechanical linkage mechanically coupled to the rod of the piston positioned to engage the rod of the metering valve for a portion of the travel of the piston to force the rod of the metering valve against the ball.

6. A drive mechanism for translating a tool of a machine tool comprising, in combination: a frame adapted to be mounted on the machine tool; a cylinder mounted on the frame having a first closure at one end thereof and a second closure at the other end thereof, each of said closures having an opening therein and the first of said closures having an aperture therein forming a bearing surface; a piston slidably disposed within the cylinder forming a fluid seal with the cylinder; a rod mounted on the piston and journaled within the aperture of the first closure of the cylinder; a reservoir having a first and second end closure at the ends thereof, each end closure being provided with an orifice therethrough; two position valve means having a first port adapted to be connected to a compressed air source, a second port in communication with the atmosphere, a third port connected to the opening in one of the closures of the cylinder, and a fourth port connected to the orifice in the first end closure of the reservoir, one position of said valve means connecting the first port thereof to the third port thereof and the second port thereof to the fourth port thereof, and the other position of said valve means connecting the first port thereof to the fourth port thereof and the second port thereof to a third port thereof; a metering valve comprising a housing having a passage extending therethrough from a first port to a second port, the first port being connected to the opening in the other end closure of the cylinder and the second port being connected to the orifice in the second end closure of the reservoir, said passage having a circular restriction therein and the housing of said metering valve having a threaded opening extending normally from the circular restriction to the exterior of the housing, a circular valve stem having external threads mating with the threads of the opening and a circular valve member disposed at the end thereof confronting the circular restriction and adapted to seat on said restriction, rotation of said stem translating the valve member relative to the restriction to control the flow of liquid lubricant through said passage, said housing having a duct opening into the passage at both ends of the duct and on opposite sides of the restriction to form a bypass about said restriction, and a one-way flow control valve disposed in said duct to permit liquid lubricant to flow from the reservoir to the cylinder without passing through the restriction of the passage.

7. A drive mechanism for translating a tool of a machine tool comprising, in combination: a frame adapted to be mounted on the machine tool; a cylinder mounted on the frame having a first closure at one end thereof and a second closure at the other end thereof, each of said closures having an opening therein and the first of said closures having an aperture therein forming a bearing surface; a piston slidably disposed within the cylinder forming a fluid seal with the cylinder; a rod mounted on the piston and journaled within the aperture of the first closure of the cylinder; a reservoir having a first and a second end closure at the ends thereof, each end closure being provided with an orifice therethrough; a pressure release valve; two position valve means having a first port adapted to be connected to a compressed air source, a second port in communication with the atmosphere, a third port connected to the opening in one of the closures of the cylinder, a fourth port connected to the orifice in the first end closure of the reservoir, and a fifth port connected to the pressure release valve, one position of said valve means connecting the first port thereof to the third port thereof and the fifth port thereof to the fourth port thereof, and the other position of said valve means connecting the first port thereof to the fourth port thereof and the second port thereof to a third port thereof; a metering valve connected between the opening in the other closure of the cylinder and the orifice in the second end enclosure of the reservoir; and a body of liquid lubricant disposed in the reservoir, the metering valve, and the portion of the cylinder, between the piston and said other closure of the cylinder.

8. A drive mechanism for a machine tool comprising, in combination: a frame adapted to be mounted on the machine tool; a cylinder mounted on the frame having a first closure at one end thereof and a second closure at the other end thereof, each of said closures having an opening therein and the first of said closures having an aperture therein forming a bearing surface; a piston slidably disposed within the cylinder forming a fluid seal with the cylinder; a rod mounted on the piston and journaled within the aperture of the first closure of the cylinder; a reservoir having a first and a second end closure at the ends thereof, each end closure being provided with an orifice therethrough; two position valve means having a first port adapted to be connected to a compressed air source, a second port in communication with the atmosphere, a third port connected to the opening in one of the closures of the cylinder, and a fourth port connected to the orifice in the first end closure of the reservoir, one position of said valve means connecting the first port thereof to the third port thereof and the second port thereof to the fourth port thereof, and the other position of said valve means connecting the first port thereof to the fourth port thereof and the second port thereof to the third port thereof; a metering valve conected between the opening in the other closure of the cylinder and the orifice in the second end closure of the reservoir; a body of liquid lubricant disposed in the reservoir, the metering valve, and the portion of the cylinder between the piston and said other closure of the cylinder, a normally open flow blocking valve connected in series with the metering valve between the opening in the other closure of the cylinder and the orifice in the second end closure of the reservoir, said flow blocking valve having an actuating member, and a stop mechanically coupled to the rod of the piston positioned to engage the actuating member of the flow blocking valve in one position of its travel to halt translation of the rod.

9. A drive mechanism for translating a tool of a machine tool comprising, in combination: a frame adapted to be mounted on the machine tool; a cylinder mounted on the frame having a first and a second end closure, each of said end closures having an opening therein and the first of said end closures having an aperture therein forming a bearing surface; a piston slidably disposed within the cylinder and sealed therein, and a rod mounted on the piston and extending through the aperture of the first end closure of the cylinder; a reservoir having a first and a second cap on opposite sides thereof, each cap being provided with an orifice therethrough; a metering valve connected between the opening in one of the end closures of the cylinder and the orifice in one of the caps of the reservoir; a body of liquid lubricant disposed in the reservoir, the metering valve, and the portion of the cylinder between the piston and the one end closure; a two position valve having a block with a linear channel extending therethrough, said block having five bores extending from the exterior surface of the block into the channel at locations spaced from each other along the axis of the channel, the central bore being adapted for connection to a source of compressed air, the bore located on one side of said central bore being connected to the orifice of the other cap of the reservoir, the bore located on the other side of the central bore being connected to the opening in the other end closure of the cylinder, and the bores located remote from the central bore communicating with the ambient atmosphere, a spool plunger slidably disposed in the channel having three spaced portions of larger cross section than the portions therebetween, said three portions forming fluid seals within the channel, closure members mounted on the block at each end of the channel sealing said channel against the passage of fluid, separate means coupling the central bore with the two portions of channel between the ends of the spool plunger and the closure members including a fluid flow restriction in at least one of said coupling means, a first normally closed control valve having an opening to the ambient atmosphere and an actuation member, said first control valve being coupled to the portion of the channel between the bore coupled to the reservoir and the adjacent end thereof, a second normally closed control valve having an opening to the ambient atmosphere and an actuation member, said second control valve being coupled to the portion of the channel between the bore coupled to the cylinder and the adjacent end of the channel, and a mechanical stop linkage adapted to be actuated by the rod of the cylinder for actuating the actuation member of the second control valve.

10. A drive mechanism for translating a tool of a machine tool comprising the elements of claim 9 wherein the reservoir has a cylindrical portion between the caps thereof and is provided with an aperture in the other cap thereof, in combination with a rod journaled within said aperture in the other cap having a channel extending therethrough, a piston mounted on the rod within the cylindrical portion of the reservoir and sealed thereto, and a removable plug sealed within the end of the channel of the rod exterior of the reservoir.

11. A drive mechanism for translating a drill type machine tool having a frame, a quill translatably mounted on the frame, a spindle rotatably disposed within the quill and carrying a drill at the end thereof, and motive means for rotating the spindle comprising the elements of claim 9 wherein the rod of the piston is mechanically coupled to the quill.

12. A drive mechanism for translating a machine tool comprising the elements of claim 9 wherein the piston is provided with a groove extending about the circumference thereof in a plane normal to the axis of the cylinder with a part cylindrical cross section, an elastomer O-ring disposed in said groove having a radius of curvature approximately equal to the radius of the groove, and an at rest diameter greater than the maximum distance between any portion of the groove and the cylinder.

13. A drive mechanism for translating a tool of a machine tool comprising the combination of claim 11 wherein the reservoir and two position valve means are assembled into a single power unit, said power unit having a cylindrical portion sealed at its ends by the first and the second cap, the second of said caps forming a manifold and said manifold having a first, second and third opening in a surface thereof disposed on a common axis and spaced from each other and a passage extending from each of said openings to the exterior of the second cap, the first of said passages communicating with the atmosphere, the second of said passages being connected to the orifice in the first end closure of the power unit, and the third of said passages communicating with the atmosphere; the two position valve being mounted on the second of said caps and having a valve block with a surface sealed to the surface of the second cap, said block having a cylindrical channel extending therethrough parallel to the axis of the openings of the second cap and a passage of restricted diameter extending therethrough parallel to the channel, said block having five bores extending from the channel to the exterior of the block communicating with the channel at spaced intervals along the axis thereof, the central of said bores being adapted to be connected to the compressed air source, the bore at one end of the block communicating with the first opening of the manifold and the bore between said bore and the central bore communicating with the second opening of the manifold, said second opening of the manifold being connected to the orifice of the first cap of said power unit, the bore at the other end of said block being connected to the third opening in the manifold for communication to the atmosphere, and the bore between said last mentioned bore and the central bore being connected to the openings in the second end closures of both cylinders, said block also having an orifice communicating with the central bore thereof, the spool type plunger slidably disposed within the channel having three spaced portions sealed to the block, a first valve head sealed on the block at one end of the channel having an opening therein, and a second valve head sealed on the block at the other end of the channel.

14. A drive mechanism for translating a tool of a machine tool comprising the combination of claim 9 wherein the metering valve has a valve block with a first channel extending therein and connected to the orifice in the first closure of the cylinder, said block having a first bore extending therein connected to the orifice in the second cap of the reservoir, a first opening disposed between the first bore and the first channel having a part spherical seat confronting the channel, a spherical ball having the same radius as the seat confronting the seat and spring biased toward said seat, a second cylindrical channel disposed in the block and extending between the first bore and first channel, a passage extending between the first bore and the second channel including a needle valve restriction, a needle valve stem confronting said restriction, a second spool type plunger slidably disposed in the second channel, said second spool having a central portion and two other portions spaced therefrom on opposite sides of the central portion, the portions being of expanded diameter and sealed on the second channel, said second spool being translatable between two positions in the second channel, a second passage in said block between the first channel and second channel confronting one of said other portions of the first position of the plunger and disposed on the side of said one other portion remote from the central portion in the second position of the plunger, two apertures in said block located between the central expanded portion of the second plunger and one of the two other expanded portions, one of said apertures being connected to a normally closed manually actuated exhaust valve and the other of said apertures being connected to the central bore of the block of the two way valve, said apertures being interconnected for all positions of the second plunger, a third aperture in said block extending into the second channel on the side of the two apertures remote from the second passage, said third aperture being connected to the portion of the channel of the two way valve between the bore thereof communicating with the cylinder and the end closure adjacent to said bore, and a fourth aperture disposed in said block further remote from said second passage than the third aperture, said fourth aperture being connected to the third passage when the second plunger is disposed in the first position and the third aperture being connected to the two apertures when said second plunger is disposed in the second position, an adjustable exhaust valve disposed in the fourth aperture, said second plunger having a stem extending to the exterior of the block; and mechanical means responsive to the maximum translation of the rod of the cylinder to translate the second spool plunger from the second position to the first position thereof.

15. A drive mechanism for translating a machine tool comprising the elements of claim 9 in combination with means to restrict the flow of fluid from the second control valve to provide a time delay before the direction of travel of the piston is reversed.

16. A drive mechanism for a machine tool comprising the elements of claim 9 in combination with a normally open fluid flow blocking valve connected in series with the metering valve between the cylinder and reservoir, said flow blocking valve having an actuating member, and mechanical linkage coupled to the rod to close said flow blocking valve approximately simultaneous with actuation of the second control valve.

17. A drive mechanism for a machine tool comprising the elements of claim 16 in combination with a second mechanical stop linkage for actuating the actuating member of the first control valve mechanically coupled to the rod of the cylinder for reversing the direction of translation of the piston in the cylinder.

18. A drive mechanism for attachment on a manual drill press having a tube supporting a housing from which a translatable spindle depends, the spindle journaling a rotatable shaft carrying a chuck at its end, comprising a frame including a base plate, a mounting plate, a cap, and adjustable means for mounting the base plate on the mounting plate, the mounting plate having a recess and the cap having a recess and being mounted on the mounting plate with the recess of the cap confronting the recess of the mounting plate to form an opening adapted to engage the tube of the drill press, the base plate having an opening therein and being mounted on the mounting plate by the adjustable mounting means with the spindle translatably extending through the opening of the base plate, a pair of piston and cylinder assemblies mounted on the base plate equidistant from the opening, each piston having a translatable shaft extending therefrom and the shafts being disposed parallel to each other, a yoke mounted on the shafts of the piston and cylinder assemblies and disposed on the side of the base plate opposite the piston and cylinder assemblies, said yoke having an aperture adapted to be aligned with the spindle of the drill press and means for mechanically mounting the spindle of the drill press on the yoke.

19. A drive mechanism comprising the elements of claim 18 wherein the adjustable mounting means comprises a linear guide disposed on the mounting plate for guiding the base plate along an axis extending between the opening formed by the recess of the mounting plate and cap and the opening of the base plate, a track on the base plate translatably engaging the guide of the mounting plate, and a lock operatively associated with the mounting plate and base plate to prevent translation of the base plate relative to the mounting plate.

20. A drive mechanism comprising the elements of claim 19 wherein the lock comprises a threaded bore in the mounting plate confronting a slot in the base plate and a cap screw extending through the slot and having threads thereon engaging the threads of the bore.

21. A drive mechanism comprising the elements of claim 19 in combination with a wedge disposed between a portion of the mounting plate remote from the opening therein formed by the recess and cap and the confronting surface of the base plate, the base plate being locked on the mounting plate between the wedge and opening in the mounting plate, whereby the base plaate may be disposed at an angle to the mounting plate to align the base plate normal to the axis of the spindle.

References Cited by the Examiner
UNITED STATES PATENTS

| | | | |
|---|---|---|---|
| 706,688 | 8/1902 | Reynders et al. | 77—33.5 |
| 2,993,511 | 7/1961 | Johnson | 137—625.64 |

WILLIAM W. DYER, Jr., *Primary Examiner.*